United States Patent
Kawakami

(10) Patent No.: US 6,329,101 B1
(45) Date of Patent: Dec. 11, 2001

(54) METHOD FOR MANUFACTURING A POWDERY MATERIAL ELECTRODE MEMBER FOR A SECONDARY CELL

(75) Inventor: Soichiro Kawakami, Nara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/447,277

(22) Filed: Nov. 23, 1999

Related U.S. Application Data

(62) Division of application No. 08/999,136, filed on Dec. 29, 1997, now Pat. No. 6,040,087.

(30) Foreign Application Priority Data

Dec. 27, 1996 (JP) .................................................. 8-349530
Jan. 29, 1997 (JP) .................................................. 9-015331

(51) Int. Cl.⁷ .................................................. H07M 4/58
(52) U.S. Cl. .................. 429/218.2; 420/900; 429/223; 429/218.1
(58) Field of Search .................. 429/218.1, 223, 429/231.8, 224, 218.2; 420/900

(56) References Cited

U.S. PATENT DOCUMENTS

| 5,690,799 | 11/1997 | Tsukahara et al. | 204/293 |
| 5,714,277 | 2/1998 | Kawakami | 429/62 |
| 5,932,372 | * 8/1999 | Rendina | 429/218.1 |

FOREIGN PATENT DOCUMENTS

| 61-64069 | 4/1986 | (JP) . |
| 61-101957 | 5/1986 | (JP) . |

OTHER PUBLICATIONS

Kohno, et al., "The electrochemical characteristics of MG–Mg$_2$Ni alloy Electrode," 37$^{th}$ Battery Symposium in Japan, (1996), pp. 389–390.

* cited by examiner

Primary Examiner—Gabrielle Brouillette
Assistant Examiner—M. Wills
(74) Attorney, Agent, or Firm—Fitzpatrick, Cella, Harper & Scinto

(57) ABSTRACT

There are disclosed a powdery material comprising a hydrogen-storing compound comprising a core layer of a hydrogen-storing alloy coated with a transition metal oxide layer and having a transition metal dispersed and carried on the outermost surface thereof, an electrode member for alkali secondary cells using the powdery material comprising a hydrogen-storing compound, and a secondary cell using the electrode member as an electrode. With such an alkali secondary cell, a strong resistance to overcharge, a high charging and discharging efficiency and a long cycle life can be implemented.

51 Claims, 5 Drawing Sheets

METHOD FOR MANUFACTURING A POWDERY MATERIAL ELECTRODE MEMBER FOR A SECONDARY CELL

This is a divisional of Ser. No. 08/999,136 filed Dec. 29, 1997, now U.S. Pat. No. 6,040,087.

BACKGROUND OF THE INVENTION

1. Field of the Invention

The invention relates to a powdery material for an active material which is the main material of a secondary cell using an alkali as the electrolyte, electrode members such as a negative electrode and positive electrode and a secondary cell. More particularly, the invention relates to a powdery material of a hydrogen-storing compound (hydrogen storage compound) for use as the main material of a negative electrode, a negative electrode formed of the hydrogen-storing compound powdery material, a powdery material comprised of nickel hydroxide subjected to coating treatment for use as the main material of a positive electrode, a positive electrode formed of the nickel hydroxide, a secondary cell comprising the above negative electrode and/or the above positive electrode and a method for manufacturing these.

2. Related Background Art

Recently, since the amount of $CO_2$ gas contained in the atmosphere increases, the possibility of global warming to occur due to the greenhouse effect has been pointed out. For example, in a thermal power plant, thermal energy obtained by burning of fossil fuel and the like is converted into electric energy, but the construction of a new thermal power plant has become difficult because a great amount of $CO_2$ gas is discharged by burning. Thus, as an effective utilization of electric power produced by generators of a thermal power plant or the like, a so-called load levelling, levelling of loads by storing the night power as surplus power into secondary cells installed at general houses and using it at the daytime during which the power consumption is large, is proposed.

For an electric automobile which discharges no substance containing $CO_x$, $NO_x$, hydrocarbons or the like associated with air pollution, the development of secondary cells having an indispensable high energy density is expected. Furthermore, in uses for power sources of portable equipments such as book-type personal computers, word processors, video cameras and portable telephones, the development of a small-sized, light-weight and high-performance secondary cell is an urgent need.

Under such circumstances as mentioned above, a high-capacity secondary cell using a hydrogen-storing alloy storing hydrogen at a high density for the negative electrode of an alkali secondary cell with an alkali solution employed as the electrolyte, what is called nickel-metal hydride battery (cell) (hereinafter, referred to as nickel-metal hydride battery) has been put into practical use.

As hydrogen-storing alloys for the negative electrode of a hydrogen-storing alloy, Mischmetal alloys typified by Mm(Ni—Co—Mn—Al)$_5$, transition metal alloys typified by Ti—Zr—Ni—V—Cr—Co—Mn and magnesium-nickel alloys such as Mg$_2$Ni and MgNi have been researched and the Mischmetal alloys and the transition metal alloys are put into practical use as electrode materials.

Both the Mischmetal alloys and the transition metal alloys have a practical capacity lower than the theoretical capacity and are desired to be further improved. Besides, as compared with the nickel-cadmium battery using a cadmium negative electrode, they have had a problem of being subject to oxidization and deterioration during the overcharge. In this regard, a method of coating hydrogen-storing alloy powder with an oxidation-resistant metal is proposed in Japanese Patent Application Laid-Open Nos. 61-64069 and 61-101957, but no secondary cell sufficiently more resistant to overcharge than the nickel-cadmium battery has yet been obtained.

With respect to the magnesium-nickel alloys, it was made public in the 37-th Battery Symposium in Japan, p. 389 (1996) that as high discharge capacity as 750 mAh/g at the first time of the charge-discharge cycle was obtained in an electrode using a Mg$_2$Ni alloy powder prepared by the mechanical grinding method, but the discharge capacity decreased with the progress of the charge-discharge cycle and no magnesium-nickel alloy electrode having a stable high discharge capacity has yet been obtained.

In the nickel-metal hydride battery, nickel hydroxide is employed as a positive electrode active material as is the case of the positive electrodes of other alkali secondary cells such as the nickel-cadmium battery. Since this nickel hydroxide is low in conductivity, cobalt monoxide or cobalt hydroxide are added in forming the positive electrode in addition to nickel hydroxide to increase the conductivity, thereby enhancing the utilizing efficiency of the positive electrode active material. However, there has remained a problem of low utilizing efficiency of the positive electrode active material of the battery at the initial stage of the charge-discharge cycle.

SUMMARY OF THE INVENTION

It is, therefore, an object of the present invention to provide in secondary cells using an alkali as the electrolyte, especially in the so-called nickel-metal hydride battery, a material comprising a compound which is non-oxidizable with a hydrogen storing amount, an electrode member suitable as a negative electrode having a large amount of hydrogen storage in an electrochemical reaction, an electrode member suitable as a positive electrode having a high efficiency of utilization and a large-electric-capacity (nickel-metal hydride) secondary cell using these. Besides, it is another-object of the present invention to provide a method for manufacturing an electrode member of the material mentioned above.

The most specific feature of the present invention lies in a powdery material comprising a hydrogen-storing compound comprising a core layer mainly composed of a hydrogen storage alloy, a metal oxide layer (second layer) provided on the core layer for imparting oxidation resistance and a dispersed metal element layer (third layer) provided on the oxidation resistant layer for activating hydrogen, with the three separate functions provided for the respective layers, in an electrode member formed of the above powdery material as the main material and in a secondary cell using the above electrode member as the negative electrode and an alkali as the electrolyte. Next, another specific feature of the present invention lies in a powdery material comprising nickel hydroxide coated with a compound comprising a transition metal and an oxygen element and being higher in conductivity than nickel hydroxide, in an electrode member formed of the nickel hydroxide powder coated with the above compound and in a secondary cell using the above electrode member as the positive electrode and an alkali as the electrolyte.

Besides, according to the present invention, a powdery material comprising a core part having a function of storing hydrogen comprising a magnesium-nickel alloy as the main component and a metal oxide layer imparting resistance to oxidation provided on the surface of the core part, an electrode member composed of the powdery material as the main material and a secondary cell using the electrode member as the negative electrode and an alkali for the electrolyte are provided.

DETAILED DESCRIPTION OF THE PREFERRED EMBODIMENTS

Figure 1:
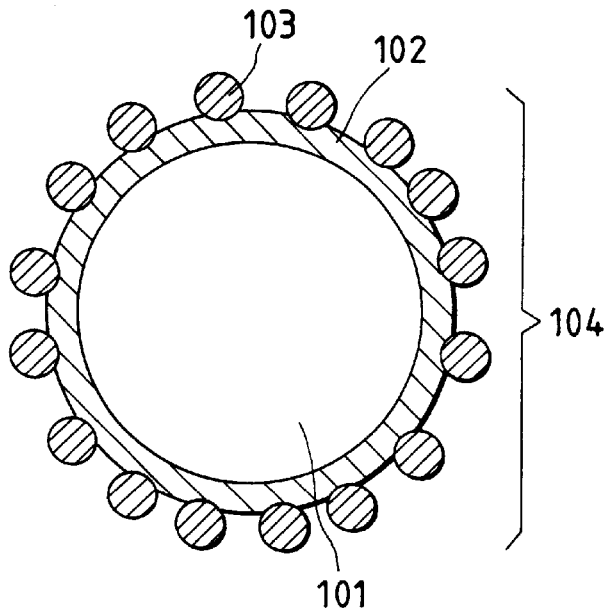
FIG. 1 is a sectional view schematically showing an example of structure of a powdery material according to the present invention.

A first aspect of the present invention is a powdery material comprising a compound having a function of storing and releasing hydrogen, having a structure of at least three layers of a core comprising a hydrogen-storing alloy, a metal oxide layer provided on the surface of the core and having a function of preventing the oxidation of the alloy and allowing atomic hydrogen or hydrogen ions to pass therethrough and a layer having dispersed a metal element having a function of activating hydrogen provided on the surface of the metal oxide layer. In the present invention, the metal oxide layer having a function of preventing the oxidation and allowing atomic hydrogen or hydrogen ions to pass therethrough is preferably comprised of a transition metal oxide layer comprising at least one transition metal selected from molybdenum, tungsten, vanadium, niobium, titanium, zirconium and iridium and an oxygen element. Besides, the dispersed metal element for activating hydrogen is preferably at least one transition metal element selected from nickel, chromium, molybdenum, cobalt, copper, palladium, platinum, iron, ruthenium, rhodium, iridium, tungsten, titanium and manganese.

A second aspect of the present invention is an electrode member for batteries which is formed of a powdery material as the main material comprising a compound having a function of storing and releasing hydrogen, having a structure of at least three layers of a core comprising a hydrogen-storing alloy, a metal oxide layer provided on the surface of the core and having a function of preventing the oxidation of the alloy and allowing atomic hydrogen or hydrogen ions to pass therethrough and a layer having a metal dispersed element having a function of activating hydrogen provided on the surface of the metal oxide layer, and which stores and releases hydrogen electrochemically. Such an electrode member is suitably used for the negative electrode of a secondary cell electrochemically utilizing the storage reaction of hydrogen.

Furthermore, a third aspect of the present invention is a secondary cell comprising at least a negative electrode (i.e., anode), an electrolyte and a positive electrode (i.e., cathode) wherein the negative electrode is formed of a powdery material as the main material comprising a compound having a function of storing and releasing hydrogen, having a structure of at least three layers of a core comprising a hydrogen-storing alloy, a metal oxide layer provided on the surface of the core and having a function of preventing the oxidation of the alloy and allowing atomic hydrogen or hydrogen ions to pass therethrough and a layer having a metal dispersed element having a function of activating hydrogen provided on the surface of the metal oxide layer.

A fourth aspect of the present invention is a powdery material comprising nickel hydroxide ($Ni(OH)_2$) coated either with a compound higher in conductivity than nickel hydroxide comprising at least one element selected from cobalt and nickel and oxygen and containing 0.5 atomic % to 10 atomic % of at least one element selected from lithium, potassium, manganese, aluminum, zinc, magnesium, molybdenum, tungsten, vanadium and titanium or with a compound higher in conductivity than nickel hydroxide comprising at least one transition metal element selected from molybdenum, tungsten, vanadium and titanium and oxygen and hydrogen elements.

A fifth aspect of the present invention is an electrode member composed of a powdery material as the main material comprising nickel hydroxide ($Ni(OH)_2$) coated either with a compound higher in conductivity than nickel hydroxide comprising at least one element selected from cobalt and nickel and oxygen and containing 0.5 atomic % to 10 atomic % of at least one element selected from lithium, potassium, manganese, aluminum, zinc, magnesium, molybdenum, tungsten, vanadium and titanium, or with a compound higher in conductivity than nickel hydroxide comprising at least one transition metal element selected from molybdenum, tungsten, vanadium and titanium and oxygen and hydrogen elements. Such an electrode member is suitably employed as a positive electrode of a second cell using an alkali as the electrolyte.

A sixth aspect of the present invention is a secondary cell comprising at least a negative electrode, a positive electrode and an alkali electrolyte wherein the positive electrode is composed of a powdery material as the main material comprising nickel hydroxide ($Ni(OH)_2$) coated either with a compound higher in conductivity than nickel hydroxide, comprising at least one element selected from cobalt and nickel and oxygen and containing 10 atomic % or less of at least one element selected from lithium, potassium, manganese, aluminum, zinc, magnesium, molybdenum, tungsten, vanadium and titanium, or with a compound higher in conductivity than nickel hydroxide and insoluble in an alkali, comprising at least one transition metal element selected from molybdenum, tungsten, vanadium and titanium and oxygen and hydrogen elements.

Incidentally, in the present invention (the present specification), "nickel hydroxide" signifies nickel (II) hydroxide ($Ni(OH)_2$).

Furthermore, as a seventh aspect of the present invention, there is provided a secondary cell comprising at least a negative electrode, a positive electrode and an alkali electrolyte wherein the negative electrode is formed of a powdery material as the main material comprising a compound having a function of storing and releasing hydrogen, having a structure of at least three layers of a core comprising a hydrogen-storing alloy, a metal oxide layer provided on the surface of the core and having a function of preventing the oxidation of the alloy and allowing atomic hydrogen or hydrogen ions to pass therethrough and a layer having a metal dispersed element having a function of activating hydrogen provided on the surface of the metal oxide layer and wherein the positive electrode is formed of a powdery material as the main material comprising a nickel hydroxide ($Ni(OH)_2$) coated either with a compound higher in conductivity than nickel hydroxide, comprising at least one element selected from cobalt and nickel and oxygen and containing 0.5 atomic % to 10 atomic % or less of at least one element selected from lithium, potassium, manganese, aluminum, zinc, magnesium, molybdenum, tungsten, vanadium and titanium, or with a compound higher in conductivity than nickel hydroxide and insoluble in an alkali, comprising at least one transition metal element selected from molybdenum, tungsten, vanadium and titanium and oxygen and hydrogen elements.

An eighth aspect of the present invention is a method for manufacturing a powdery material forming the main constituent of the electrode (negative electrode) of a secondary cell, preferably using an alkali as the electrolyte and especially preferably utilizing the electrochemical storage reaction of hydrogen, comprising at least the steps of preparing a core comprising a hydrogen-storing alloy, providing on the surface of the core a metal oxide layer having a function of preventing the oxidation of the alloy and allowing atomic hydrogen or hydrogen ions to pass therethrough and dispersing on the surface of the metal oxide layer a metal element having a function of activating hydrogen, or comprising at least the step of providing, on the surface of a core comprising an alloy of magnesium and nickel as the main component having the hydrogen storing function, a metal oxide layer having a function of preventing the oxidation of the alloy and allowing atomic hydrogen or hydrogen ions to pass therethrough.

A ninth aspect of the present invention is a method for manufacturing an electrode member (negative electrode) employed in a secondary cell, preferably using an alkali as the electrolyte and especially preferably utilizing the electrochemical storage reaction of hydrogen, comprising, in addition to the above-mentioned manufacturing steps of a powdery material comprising a hydrogen-storing compound, the step of forming an electrode member from the above compound powder and a collector. Besides, in the above method for manufacturing a negative electrode, preferably at least two auxiliary conductive materials different in shape may be added to the above compound powder and the mixture may be shaped on the electric collector.

A tenth aspect of the present invention is a method for manufacturing a powdery material as the main material of an electrode (positive electrode) employed in a secondary cell preferably using an alkali as the electrolyte, comprising the step of coating nickel hydroxide powder either with a compound higher in conductivity than nickel hydroxide comprising at least one selected from cobalt element and nickel and oxygen and containing 0.5 atomic % to 10 atomic % of at least one element selected from lithium, potassium, manganese, aluminum, zinc, magnesium, molybdenum, tungsten, vanadium and titanium, or with a compound higher in conductivity than nickel hydroxide comprising at least one element selected from molybdenum, tungsten, vanadium and titanium and oxygen.

An eleventh aspect of the present invention is a method for manufacturing an electrode member serving the positive electrode in a secondary cell preferably using an alkali as the electrolyte, comprising, in addition to the above-mentioned coating treatment step of nickel hydroxide powder, the step of forming an electrode member from the powdery material comprising nickel hydroxide subjected to the coating treatment and a collector.

A powdery material according to the first aspect of the present invention is applicable to the negative electrode active material powder of a secondary cell preferably using an alkali as the electrolyte, can impart separate functions to respective layers by employing a hydrogen-storing alloy powder as a core layer, coating the surface thereof with a metal oxide layer comprising a metal element and oxygen element and dispersing and having carried the metal on the outermost surface; that is, can adsorb hydrogen on the dispersed metal layer of the top surface, generate an active atomic hydrogen or hydrogen ions by the catalysis of the transition metal efficiently and storing the atomic hydrogen or hydrogen ions passing through the metal oxide layer for preventing the oxidation of the hydrogen-storing alloy into the hydrogen-storing alloy of the core layer.

Besides, in the powdery material using a magnesium-nickel alloy as the core layer, the magnesium-nickel alloy, is preferably made amorphous by a technique such as mechanical alloying and mechanical grinding so that an excellent electrochemical hydrogen storage function is obtained even at room temperature. However, when charging and discharging cycle is repeated in the case of using such a powdery material as the negative electrode material of a nickel-metal hydride cell, there may be a problem that the reaction of an alkaline electrolyte solution with the alloy causes an abrupt lowering in hydrogen storage function (charged electric quantity) of the negative electrode. Thus, in the case of using the powdery material as the negative electrode material of a nickel-metal hydride cell, coating at least the core layer comprised of a magnesium-nickel alloy with a metal oxide inhibits the deterioration of the core layer due to the reaction of an alkaline electrolyte solution with the core layer comprised of the alloy and prevents the above-mentioned abrupt lowering in hydrogen storage function, thus implementing a high-capacity alkali secondary cell.

Furthermore, by composing the above metal oxide layer of a transition metal oxide layer comprising at least one transition metal element selected from molybdenum, tungsten, vanadium, niobium, titanium, zirconium and iridium and oxygen element, a layer to allow the atomic hydrogen or hydrogen ions generated on the top surface layer to easily pass therethrough to the core layer of the hydrogen-storing alloy can be formed. Further, forming a compound oxide of the above-mentioned metal oxide with at least one oxide selected from aluminum oxides and silicon oxides can improve alkali resistance. Besides, by employing at least one transition metal selected from nickel, chromium, molybdenum, cobalt, copper, palladium, platinum, iron, ruthenium, rhodium, iridium, tungsten, titanium and manganese as the metal to be dispersed on the outermost surface, it becomes possible to easily adsorb hydrogen and to easily generate atomic hydrogen or hydrogen ions.

By employing the powdery material comprising a compound having a function of storing hydrogen (compound powder) as the main material of a negative electrode active material to form an electrode (negative electrode) and by adopting this for the negative electrode of an alkali secondary cell, the amount of hydrogen stored by the charge reaction increases and the charging efficiency, the charging capacity and the discharging capacity also increase. Besides, it becomes possible to obtain an alkali secondary cell according to the third aspect of the present invention comprising a negative electrode less subject to functional deterioration due to oxygen gas generated at the overcharge. Furthermore, since by adding at least two powdery auxiliary conductive materials of different shapes selected from shapes of flake, sphere, filament, needle, spike and such others to the powdery material mentioned above (negative electrode active material) to form an electrode member, the impedance can be reduced, adopting this electrode as the negative electrode in an alkali secondary cell can be provided a secondary cell of a high charging and discharging efficiency and a long cycle life. Since adding auxiliary conductive materials of at least two different shapes selected from flake, sphere, filament, needle, spike and such others can increase the packing density of the negative electrode active material and the auxiliary conductive materials, the impedance of the negative electrode can be reduced.

Furthermore, the fourth aspect of the present invention is a powdery material comprising nickel hydroxide coated with a layer of a compound higher in conductivity than nickel hydroxide comprising at least a transition metal and oxygen, preferably usable for the positive electrode active material of an alkali secondary cell. Besides, in an electrode member formed of the nickel hydroxide powder (powdery material) coated with the above compound layer comprising at least a transition metal element and oxygen element and a collector (electrode member according to the fifth aspect of the present invention), the nickel hydroxide powder of the active material (positive electrode active material) is coated with the coating layer higher in conductivity than nickel hydroxide, and accordingly use of this member as the positive electrode of a secondary cell enhances the electronic conductivity in the nickel hydroxide powder as compared with a positive electrode formed of nickel hydroxide without a coating layer, thereby enabling the impedance to be reduced. Besides, adopting the positive electrode for an alkali secondary cell enables an alkali secondary cell (secondary cell according to the sixth aspect of the present invention) having a high utilizing efficiency of the positive electrode active material in the charging and discharging reactions and a large charging capacity and discharging capacity to be obtained.

Furthermore, it is preferred that at least 1% by weight to 30% by weight of nickel (II) nickel (III) hydroxide ($Ni_3O_2(OH)_4$) be contained in addition to the nickel hydroxide powder mentioned above to make an electrode member (positive electrode). In this case, since the positive electrode of an unused secondary cell is composed of at least 1% by weight to 30% by weight of nickel (II) nickel (III) hydroxide in addition to the nickel hydroxide mentioned above of the main material and since the density of nickel (II) nickel (III) hydroxide ($Ni_3O_2(OH)_4$) is smaller than that of nickel hydroxide $Ni(OH)_2$, even when low-density γ-type nickel oxyhydroxide (γ-NiOOH) is formed at overcharge or at charge of a high efficiency, the expansion of the electrode can be prevented to suppress deterioration of life. Further, $Ni_3O_2(OH)_4$ has a high oxidation value of nickel and therefore contributes to increase of capacity at discharge.

In addition, the adoption of an electrode member using the powdery material according to the first aspect of the present invention as the negative electrode and of an electrode member of the powdery material according to the fourth aspect of the present invention as the positive electrode enables an alkali secondary cell, especially preferably a nickel-metal hydride secondary cell, high in capacity, high in charging and discharging efficiency, resistant to overcharge and long in cycle life to be obtained.

Furthermore, in the present invention, the above-mentioned powdery material (compound powder) comprising the hydrogen-storing compound is prepared by forming a layer comprising a transition metal oxide on the surface of hydrogen-storing alloy powder. Then, a transition metal is dispersed and carried on the outermost surface. The above-mentioned transition metal oxide layer can be easily formed by dipping hydrogen-storing alloy powder into one or more solutions selected from a polymetallic acid salt solution, a peroxopolymetallic acid solution and a metallic acid solution of at least one metal element selected from molybdenum, tungsten, vanadium, niobium, titanium, zirconium, and iridium. At that time, by adding an alumina sol or silica sol solution, formation of a compound oxide with an aluminum oxide or silicon oxide can be attained to improve alkali resistance. Furthermore, by adding the hydroxide or salt of an alkali metal element, an alkali earth metal element and a rare earth metal element to the one or more solutions of the polymetallic acid salt solution, peroxopolymetallic acid solution and metallic acid solution mentioned above, a transition metal oxide layer containing at least one metal element selected from an alkali metal element, an alkaline earth metal element and a rare earth metal element can be easily formed. The addition of the above-mentioned alkali metal element, alkaline earth metal element or rare earth metal element enables the conductivity of the transition metal oxide to be improved. Furthermore, the dispersing and carrying of the transition metal mentioned above onto the outermost surface can be easily accomplished by depositing the salt of at least one transition metal element selected from nickel, chromium, molybdenum, cobalt, copper, palladium, platinum, iron, ruthenium, rhodium, iridium, tungsten, titanium and manganese thereon and then, directly reducing the salt of the transition metal element or by allowing a precipitant such as an alkali to react with the salt of the transition metal element to deposit a transition metal hydroxide or the like once and subjecting it reducing treatment. The above bypass through a hydroxide of the transition metal enables the reduction temperature for reduction to metal to be lowered.

Besides, in the present invention, magnesium-nickel alloy powder, as one example of hydrogen-storing alloy powder used for the core layer of the powder material comprising the hydrogen-storing compound can be simply prepared by dipping magnesium powder in a nickel salt solution and employing a chemical reaction utilizing a difference in ionization tendency. Furthermore, by similarly employing a chemical reaction utilizing a difference in ionization tendency, a trace element can be easily introduced into the alloy by replacing a part of magnesium element in the magnesium-nickel alloy powder with at least one element selected from elements smaller in ionization tendency such as titanium, beryllium, manganese, aluminum, zinc, chromium, iron, indium, cobalt, molybdenum, tin, lead, antimony, bismuth, copper, silver, palladium and platinum. The introduction of the trace element in an amount of 20 atomic % or less makes it possible to obtain a compound powder which electrochemically stores and releases hydrogen more stably.

Furthermore, in the present invention, at least two powdery auxiliary conductive materials of different shapes selected from flake, sphere and filament, or the like comprised of at least one material selected from a carbonaceous material (preferably, amorphous carbon or graphite), nickel, copper, silver, indium and tin are mixed with the compound powder prepared above for a core of a hydrogen-storing alloy and a binding agent of an organic polymer or the like or a solvent is further added if necessary. By subjecting this mixture to the technique of application, press or sintering, an electrode member having an active material layer (negative electrode active material layer) of a reduced impedance of the electrode can be formed.

In the preparation of the powdery material comprising the above hydrogen-storing compound and the formation of the electrode member, the addition of a heat treatment step under an atmosphere comprising one gas or more selected from nitrogen gas, argon gas, helium gas and hydrogen gas or hydrogen plasma or under a reduced pressure enables hydrogen-storing compound powder having a function of stably exhibiting the characteristics and an electrode member comprising thereof to be formed.

Besides, in the present invention, the above-mentioned nickel hydroxide (powdery material) coated with a compound higher in conductivity than nickel hydroxide preferably usable as the positive electrode active material of an alkali secondary cell can be prepared by allowing a cobalt salt, a nickel salt or cobalt and nickel salts to react with alkali hydroxide or an alkali metal salt to form the coating layer mentioned above on the surface of nickel hydroxide powder. And, with the present invention, the above nickel hydroxide coating layer can be easily formed by dipping nickel hydroxide powder in one solution or more selected from a polymetallic acid salt solution, a peroxopolymetallic acid solution and a metallic acid solution of one metal element or more selected from molybdenum, tungsten, vanadium, niobium, titanium, zirconium and iridium and then dry heating. At the time of forming the coating layer for nickel hydroxide, salt(s) of one element or more selected from lithium, potassium, manganese, aluminum, zinc, magnesium, molybdenum, tungsten, vanadium and titanium may be added to easily form a coating layer containing 0.5 atomic % to 10 atomic % of the added elements. The above added elements of not more than 10 atomic % is effective for the enhancement of conductivity.

Besides, with the present invention, an electrode member preferably applicable to the positive electrode of a battery can be obtained by adding an organic polymer binding agent, a solvent and an auxiliary conductive material appropriately to the above coated nickel hydroxide powder if necessary, mixing them and filling or applying the mixture into or onto a porous collector.

Furthermore, in forming an electrode member (positive electrode of a secondary cell) from the above-mentioned nickel powder, it is preferable to mix at least 1 to 30% by weight of nickel (II) nickel (III) hydroxide.

Furthermore, an alkali secondary cell using the above-mentioned powdery material and electrode members in the present invention can be fabricated specifically by using a negative electrode using the powdery material according to the first aspect of the present invention and a positive electrode using the powdery material according to the fourth aspect of the present invention, interposing a separator between the negative electrode and the positive electrode, putting the assembly in a cell housing, connecting lead wires taken out from the negative electrode and the positive electrode to the input and output terminals, injecting and retaining an electrolyte in the separator and putting a cover over the cell housing to seal. In this manner, an alkali secondary cell high in capacity, resistant to overcharge and long in cycle life can be fabricated.

Incidentally, in the present invention, the term "active material" signifies a substance taking part in the (repeated) electrochemical reversible reaction of charge and discharge in a cell. Furthermore, it also covers the compound mentioned above which itself takes part in the above reaction and holds other substances taking part in the above reaction.

Hereinafter, the preferred embodiments of the present invention will be described referring to FIGS. 1, 2, 3, 4 and 5.

FIG. 1 is a sectional view schematically showing one example of powdery material (compound powder) comprising a hydrogen-storing alloy preferably used for a negative electrode as the negative electrode active material. In FIG. 1, the hydrogen-storing compound 104 comprises three layers roughly separated in function of a core layer 101 made of a hydrogen-storing alloy, a transition metal oxide layer 102 made of a transition metal and oxygen element and a transition metal 103 dispersed and carried on the surface. When a secondary cell is fabricated by using a hydrogen-storing compound 104 as the negative electrode active material, a positive electrode made of nickel hydroxide as the positive electrode active material and an electrolyte comprising an aqueous alkali hydroxide solution, the transition metal 103 dispersed and carried on the outermost surface adsorbs the hydrogen generated at the negative electrode during the charging to efficiently create active atomic hydrogen or hydrogen ions, passes through the transition metal oxide layer 102, reaches the hydrogen-storing alloy of the core layer 101 and is stored among the atoms. That is, since by the catalytic action of the dispersed and carried transition metal 103, active hydrogen easily stored by the hydrogen-storing alloy of the core layer becomes effectively likely to be generated, the amount of stored hydrogen increases also. Besides, if overcharge takes place at the above charging time, an excess of oxygen gas is generated at the positive electrode and reaches the negative electrode. At this time, if the hydrogen-storing alloy 101 of the negative electrode is not coated with the transition metal oxide layer 102, the hydrogen-storing alloy 101 is oxidized and the hydrogen storing power decreases and the charging capacity of the secondary cell decreases. In brief, the transition metal oxide layer 102 mentioned above functions to suppress the oxidation of the hydrogen-storing alloy 101 of the core layer 102. And, the transition metal oxide layer 102 also functions to store a small amount of hydrogen between the layers. Further, forming a compound oxide of the transition metal oxide with aluminum oxide or silicon oxide improves resistance to alkali hydroxide. The hydrogen-storing storing compound powder 104 is formed by coating the hydrogen-storing alloy powder 101 of the core with the transition metal oxide layer 102 and then having a transition metal element carried on the surface.

Figure 2:
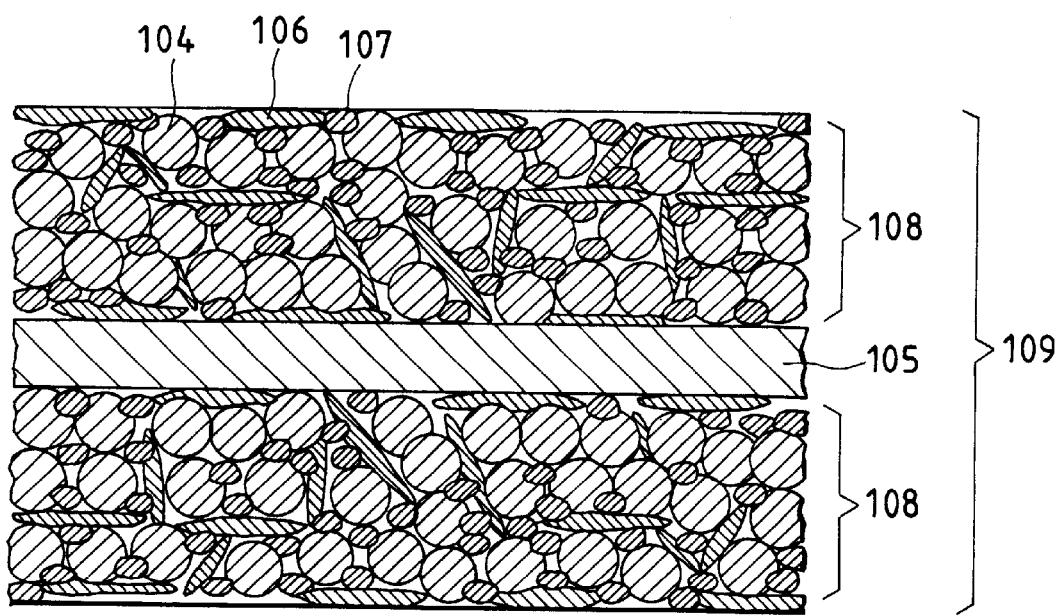
FIG. 2 is a sectional view schematically showing an example of an electrode member (negative electrode) according to the present invention.

FIG. 2 is a schematic sectional view showing the structure of one example of an electrode member according to the present invention, i.e., one example of electrode member (negative electrode) with two active material layers formed on both sides of a collector. The electrode member (negative electrode) 109 of FIG. 2 is constructed so as to form active material layers 108 comprising the above-mentioned hydrogen-storing compound powder 104 shown in FIG. 1 on a collector 105. The electrode member 109 can be fabricated by mixing the hydrogen-storing compound powder 104 with auxiliary conductive material 106 and 107 of two different shapes or more such as flake and sphere to form active material layers 108 with the dry press or by adding a binding agent (not shown in FIG. 2) and a solvent to the mixture of the above hydrogen-storing compound powder and the auxiliary conductive materials to prepare a paste and form an active material layer 108 by the application thereof or further by a sintering. The electrode member 109 fabricated thus can be employed as the negative electrode of a secondary cell, for example, using nickel hydroxide as the positive electrode active material and an electrolyte comprising an aqueous alkali hydroxide solution and functions as a negative electrode with large charging capacity and proof against the overcharge on account of the action of the hydrogen-storing compound powder 104 as described above.

Figure 3:
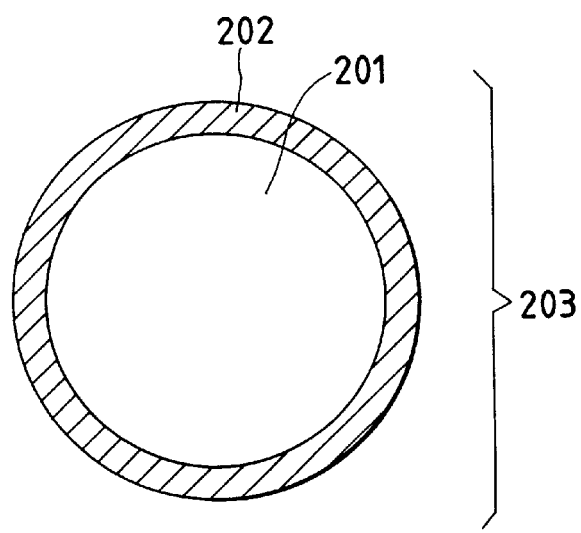
FIG. 3 is a sectional view schematically showing another example of structure of a powdery material according to the present invention.

FIG. 3 is a sectional view schematically showing one structure example of powdery material serviceable for the positive electrode active material of a secondary cell. In FIG. 3, the powdery material (positive electrode active material powder) 203 comprised nickel hydroxide powder (Ni(OH)$_2$) 201 and a coating layer 202 higher in conductivity than nickel hydroxide composed of at least one transition metal other than nickel and oxygen.

Figure 4:
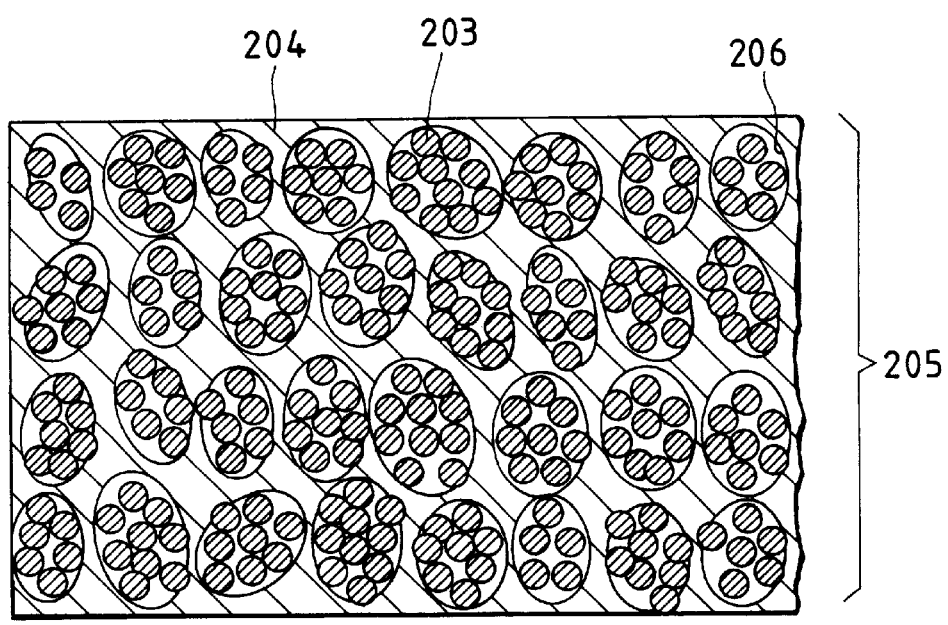
FIG. 4 is a sectional view schematically showing an example of an electrode member (positive electrode) according to the present invention.

FIG. 4 is a sectional view schematically showing one example of an electrode member (positive electrode) using the powdery material shown in FIG. 3. The electrode member 205 is formed by filling a powdery material (positive electrode active material) 203 comprising the above nickel hydroxide powder 201 coated with the coat layer 202 higher in conductivity than nickel hydroxide composed of a transition metal and oxygen element into the pore portion 206 of the porous collector 204. If necessary, the electrode member (positive electrode) 205 can be fabricated by adding and mixing an auxiliary conductive material, a binding agent and a solvent to a powdery material (positive electrode active material) 203, preparing a paste and filling the paste into a porous collector. Besides, the thickness of the positive electrode can be adjusted appropriately by means of a press. With the powdery material (positive electrode active material) 203 in the above electrode member (positive electrode) 205, the provision of the highly conductive coating layer 202 formed on the surface of the nickel hydroxide powder 201 increases the electronic conductivity among the filled positive electrode active material powder and can reduce the impedance of the electrode member (positive electrode), thereby raising the utilizing efficiency of charging and discharging reactions of the positive electrode active material, i.e., increasing the charging and discharging capacity.

Figure 5:
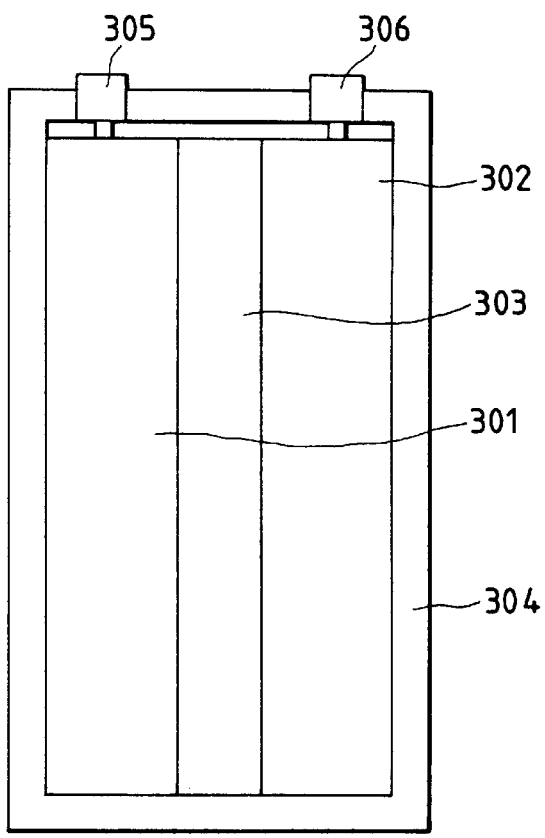
FIG. 5 is a schematically sectional view of an example of an alkali secondary cell according to the present invention.

FIG. 5 is a sectional view showing one example of schematic structure of a secondary cell according to the present invention. The secondary cell of FIG. 5 is so constructed that a negative electrode 301 for storing hydrogen by the charging reaction, a positive electrode 302 comprising a positive electrode active material mainly composed of nickel hydroxide, a separator and an alkali hydroxide electrolyte 303 are put in a cell housing 304 and the negative electrode 301 and the positive electrode 302 are connected to the negative electrode terminal 305 and the positive electrode terminal 306, as the input/output terminals. Incidentally, when a solid electrolyte is adopted for the electrolyte, there are cases where a separator is not provided. With the secondary cell of FIG. 5 in the present invention, the negative electrode and/or the positive electrode according to the present invention are used for both or either of the negative electrode 301 and the positive electrode 302. Thereby, it becomes possible to fabricate a secondary cell which is highly resistant to overcharge and high in capacity.

(Dispersion of a Transition Metal Element onto the Surface of the Hydrogen-storing Alloy)

On the outermost surface of a powdery material (e.g., material as shown in FIG. 1) comprising a hydrogen-storing compound according to the present invention, one transition metal element or more having a work function of about 4.5 eV and the shortest inter-atomic distance of 0.248 to 0.255 nm and 0.27 to 0.28 nm selected from nickel, chromium, molybdenum, copper, palladium, platinum, iron, ruthenium, rhodium, iridium, tungsten, titanium and manganese is dispersed. These transition metal elements adsorb hydrogen, exhibits the $D_2$ (deuterium)-$H_2$ (hydrogen) exchange reaction and creates active hydrogen atoms easily stored by the core of the hydrogen-storing alloy. The thickness of the layer in which this transition metal is dispersed is preferably not less than 1 nm and not more than 30 nm and more preferably not less than 5 nm and not more than 10 nm so that activated atomic hydrogen easily diffuses in the core layer. The layer thickness can be measured by the transmission electron microscope, the scanning Auger microanalyzer and so on.

As more concrete method for dispersing a transition metal element onto the surface of the hydrogen-storing compound powder (alloy) subjected to the coating treatment by a metal oxide layer as described below, a salt of a transition metal is adhered to the hydrogen-storing alloy powder coated with the metal oxide layer, then the adhered salt of the transition metal is reduced to prepare hydrogen-storing alloy powder coated with the metal oxide on which the above transition metal element is dispersed.

Besides, as another concrete method, after hydrogen-storing alloy powder coated with a metal oxide layer is dipped into a solution of a transition metal salt, a precipitant is reacted with the mixed solution to deposit a compound of a transition metal on the surface of the hydrogen-storing alloy powder coated with the metal oxide and the deposited compound of the transition metal is reduced to prepare hydrogen-storing alloy powder coated with the metal oxide on which the above transition metal element is dispersed.

As the salt of the transition metal as mentioned above, one salt or more selected from halides, nitrates, carbonates, organic acid salts and sulfates can be included.

As the precipitant as mentioned above, alkali compounds such as hydroxides and carbonates of alkali metals, ammonium salts and amines are used and specifically as preferred examples of compounds, one compound or more selected from sodium hydroxide, potassium hydroxide, lithium hydrozide, sodium carbonate, sodium hydrogen carbonate, ammonium carbonate and urea can be included.

The above reduction reaction is performed in the atmosphere of a reducing gas and as the reducing gases, one gaseous substance or more selected from hydrogen, carbon monoxide, hydrogen iodide, hydrogen sulfide, sulfurous acid can be included. The reduction temperature is preferably 500° C. or lower and more preferably 350° C. or lower. And, concerning the dispersion of nickel metal element, water is added to the hydrogen-storing compound powder and nickel formate, the aqueous solution is dried after mixing, nickel formate can be decomposed at about 250° C. in the hydrogen gas flow or under a vacuum to obtain the compound powder with metal nickel dispersed on the surface layer.

(Coating of the Hydrogen-storing Alloy Powder with a Metal Oxide Layer)

With the above-mentioned hydrogen-storing (alloy) powder, a metal oxide layer composed of one transition metal element or more selected from molybdenum, tungsten, vanadium, niobium, titanium, zirconium and iridium, and oxygen element is formed. This metal oxide layer allows active atomic hydrogen or hydrogen ions to easily diffuse and functions to suppress the oxidation of the core layer for storing hydrogen. Of the oxides of the transition metals, titanium oxides and zirconium oxides have high alkali resistance and are preferred materials. Further, as described above, in order to improve alkali resistance of the transition metal oxides, they are preferably subjected to compound oxide formation with at least one oxide selected from oxides of aluminum and silicon. Further, the oxides of aluminum and silicon are preferred to be amorphous in order to allow atomic hydrogen or hydrogen ions to easily pass the metal oxide layer.

The the above-mentioned hydrogen-storing (alloy) powder also comprises the transition metal oxide layer composed of one transition metal element or more selected from molybdenum, tungsten, vanadium, niobium, titanium, zirconium and iridium, and oxygen element formed outside the core layer for storing hydrogen and one transition metal or more selected from nickel, chromium, molybdenum, cobalt, copper, palladium, platinum, iron, ruthenium, rhodium, iridium, tungsten, titanium and manganese dispersed outside the transition metal oxide layer.

The above transition metal oxide layer is preferably not less than 10 nm and not more than 1 $\mu$m and more preferably not less than 20 nm and not more than 0.5 $\mu$m so that atomic hydrogen or hydrogen ions diffuses and easily reaches the core layer for storing hydrogen. Besides, the above transition metal oxide layer does not need to perfectly coat the core layer for storing hydrogen and the above core layer is covered with the above transition metal oxide layer preferably in not less than 50% of the surface area and more preferably in not less than 80%. As the above transition metal oxide layer, when a hydrogen-storing alloy according to the present invention is employed for the negative electrode of nickel metal hydride cell, the porous ones adsorbing or containing water or the ones capable easily adsorbing or containing water are preferable so that the hydrogen generated during the charging easily diffuses into the core layer of the hydrogen-storing alloy. Furthermore, in order to raise the durability to the stress breakdown due to expansion and compression in the storage and release of hydrogen by the hydrogen-storing alloy, the structure of the above transition metal oxide layer is preferably amorphous or a water-contained gel.

As examples of methods for preparing the above transition metal oxide layer, a transition metal oxide can be coated onto the hydrogen-storing alloy powder by using the vacuum deposition methods and the CVD (Chemical Vapor Deposition) methods such as electron beam deposition, sputtering, plasma CVD, and laser assist CVD and the spray process, but a preparing method using the sol-gel process, ion-exchange or chemical reaction and another preparing method utilizing anodization or electrochemical deposition reaction are more preferred techniques for preparing the above transition metal oxide layer.

Besides, in the case of using a magnesium-nickel alloy as the core layer, since an amorphous magnesium-nickel alloy is superior in the charging and discharging characteristics at room temperature to a crystalline one, it is advisable to form a transition metal oxide layer at a temperature as not allowing the magnesium-nickel alloy to be crystallized, i.e., at 400° C. or lower and preferably at 300° C. or lower. As a method for forming the above metal oxide layer on a magnesium-nickel alloy, the plasma oxidation, plasma CVD, laser CVD, anodization and electrochemical deposition process can be preferably adopted. Among these, the formation of an oxide layer by the anodization is carried out in such a manner that after forming on the surface of the core comprised of a magnesium-nickel alloy, an anodizable layer of the transition metal material by the vapor deposition, the plating or the like, the product is dipped into an electrolyte solution and energized with the counter electrode being the cathode and the electrode comprised of the magnesium-nickel alloy being employed as the anode to form an oxide coat of the above metal. The oxide layer formed by the above anodization is amorphous unless subjected to a heat treatment at high temperatures and greatly effective especially for the inhibition of cycle deterioration in the charging and discharging.

Various methods for coating the hydrogen-storing powder with a tungsten oxide when selecting tungsten as a transition metal element will be described.

(a) After the hydrogen-storing alloy powder is dipped into an aqueous solution of ammonium polytungstate such as ammonium paratungstate $(NH_4)_{10}W_{12}O_{41} \cdot 5H_2O$, a tungsten oxide layer can be formed on the surface of the hydrogen-storing alloy powder by heating at 400–600° C. in the hydrogen gas flow. By adding an alkali metal salt, an alkaline earth metal salt or a rare earth metal salt into the ammonium salt solution mentioned above, there can be easily obtained a transition metal oxide containing an alkali metal element, an alkaline earth metal element or a rare earth metal element also.

(b) By allowing an aqueous solution of an alkali metal salt such as sodium tungstate $Na_2WO_4$ to pass through a strongly acidic cation exchange resin column and exchanging sodium ions with hydrogen ions in the aqueous solution, an aqueous tungstic acid solution is obtained. After hydrogen-storing alloy powder is dispersed in the obtained aqueous tungstic acid solution and the solution is allowed to stand, a tungsten gel layer comprising tungsten oxides can be formed on the surface of the hydrogen-storing alloy powder by separating the hydrogen-storing alloy powder to which the gelified tungstic acid is adhered from the solution and by the dry heating.

(c) By adding aqueous hydrogen peroxide water to metal tungsten powder, tungsten carbide powder or tungsten nitride powder, the reaction is allowed to conclude and an excess of the aqueous hydrogen peroxide is then decomposed in the presence of a platinum catalyst to prepare a peroxopolytungstic acid $(2WO_3 \cdot H_2O_2 \cdot nH_2O)$ solution. After hydrogen-storing alloy powder is dispersed into the prepared peroxopolytungstic acid solution and the solution is allowed to stand, the hydrogen-storing alloy powder coated with a peroxotungstic acid layer can be obtained by separating the hydrogen-storing alloy powder with peroxopolytungstic acid adhered thereto and by the dry heating.

Also to the preparation of hydrogen-storing alloy powder coated with other oxide layers than the tungsten oxide layer, ones of molybdenum, vanadium, niobium or titanium, the method mentioned above may be applied.

In place of ammonium paratungstate in the above (a), ammonium molybdate $(NH_4)_6Mo_7O_{24} \cdot 4H_2O$, ammonium metavanadate $NH_4VO_3$ and ammonium niobate $NH_4NbO_3$ can be also used.

In place of sodium tungstate $Na_2WO_4$ in the above (b), lithium tungstate $Li_2WO_4$, potassium tungstate $K_2WO_4$ sodium molybdate $Na_2MoO_4$, lithium molybdate $Li_2MoO_4$, potassium molybdenate $K_2MoO_4$, sodium metavanadate $NaVO_3$, lithium vanadate $LiVO_3$, potassium metavanadate $KVO_3$, sodium niobate $NaNbO_3$, lithium niobate $LiNbO_3$ and potassium niobate $KNbO_3$ can be also used.

In place of tungsten W, tungsten carbide WC or tungsten nitride WN or $W_2N$ in the above (c), molybdenum Mo, molybdenum carbide MoC or $MO_2C$, molybdenum nitride MoN or $Mo_2N$, vanadium V, vanadium carbide VC, vanadium nitride VN, niobium Nb, niobium carbide NbC, niobium nitride NbN, titanium Ti, titanium carbide TiC and titanium nitride TiN can be also used.

Besides, as another method for coating the hydrogen-storing alloy powder with an oxide layer of vanadium, amorphous vanadium oxide is formed by rapidly cooling the crystal of vanadium pentaoxide $V_2O_5$ molten at high temperatures and dissolved in water to prepare a sol solution and hydrogen-storing powder is dispersed either into this sol solution or into the sol solution prepared by flowing the molten vanadium pentaoxide into water and allowed to stand and thereafter the hydrogen-storing alloy powder coated with a vanadic acid gel layer comprising oxides of vanadium can be obtained by the separation and dry heating. This approach is applicable also to niobium, where niobium pentaoxide $Nb_2O_5$ is employed.

Besides, after hydrogen-storing powder is dispersed into the sol solution prepared by the hydrolysis, what is called sol-gel method, of alkoxide as a compound of a transition metal and an alcohol and the solution is allowed to stand, the hydrogen-storing alloy powder coated with the above metal oxide layer can be obtained by the separation and dry heating. As the reaction for obtaining a metal oxide layer, the hydrolysis reaction can be employed using acetyl acetonate in place of alkoxide as the raw material.

Furthermore, after hydrogen-storing alloy powder is dispersed into an alkoxide solution and the solution is allowed to stand, the hydrogen-storing alloy powder coated with the above transition metal oxide layer can be obtained by the separation and heating, followed by contact with an oxygen plasma.

The examples of the alkoxide include pentaethoxy tungsten $W(OC_2H_5)_5$, pentaisopropoxy tungsten $W(O-iC_3H_7)_5$, pentaethoxy molybdenum $Mo(OC_2H_5)_5$, trimethoxy vanadyl $VO(OCH_3)_3$, tripropoxy vanadyl $VO(O-n-C_3H_7)$, triisobutoxy vanadyl $VO(O-i-C_4H_9)_3$, tri-sec-butoxy vanadyl $VO(O-sec-C_4H_9)_3$, tri-t-butoxy vanadyl $VO(O-t-C_4H_9)_3$, pentamethoxy niobium $Nb(OCH_3)_5$, pentaethoxy niobium $Nb(OC_2H_5)_5$, pentaisopropoxy niobium $Nb(O-iC_3H_7)_5$, pentaethoxy niobium $Nb(O-n-C_3H_7)_5$, pentaisobutoxy niobium $Nb(O-i-C_4H_9)_5$, pentabutoxy niobium $Nb(O-n-C_4H_9)_5$, penta-sec-butoxy niobium $Nb(O-sec-C_4H_9)_5$, tetramethoxy titanium $Ti(OCH_3)_4$, tetraethoxy titanium $Ti(OC_2H_5)_4$, tetrapropoxy titanium $Ti(O-n-C_3H_7)_4$, tetraisobutoxy titanium $Ti(O-i-C_4H_9)_4$, tetra-sec-butoxy titanium $Ti(O-sec-C_4H_9)_4$, tetra-t-butoxy titanium $Ti(O-t-C_4H_9)_4$, tetramethoxy zirconium $Zr(OCH_3)_4$, tetraethoxy zirconium $Zr(OC_2H_5)_4$, tetraisopropoxy zirconium $Zr(O-n-C_3H_7)_4$, tetraisobutoxy zirconium $Zr(O-i-C_4H_9)_4$, tetra-sec-butoxy zirconium $Zr(O-Sec-C_4H_9)_4$ and tetra-t-butoxy zirconium $Zr(O-t-C_4H_9)_4$.

After hydrogen-storing alloy powder is dipped into the solution of the transition metal salt as mentioned above, precipitation occurs as a hydroxide of the transition metal by the reaction with an alkali added thereto, hydrogen-storing alloy powder with the hydroxide of the transition metal deposited and adhered is separated and the hydrogen-storing alloy powder coated with transition metal oxides can be obtained by dry heating.

As the method for forming a compound oxide of the oxides of aluminum or silicon with the above-mentioned transition metal oxide, there can be employed the sol-gel process, the CVD method the anodization method and the like.

(Method for Preparing the Hydrogen-storing Powder (Core Material)

As hydrogen-storing alloy powder to be used for the core portion of a powdery material comprising a hydrogen-storing compound according to the present invention, the multi-component ones obtained by the partial substitution of Ni of the $MmNi_5$ hydrogen storing alloy (Mm: Mischmetal) with Mn, Al and Co, transition metal hydrogen-storing alloys of multi-component alloys of Zr, Ti, V, Ni, Mn, Co, Fe and the like, magnesium-nickel alloys, or the like may be included.

As methods for producing the hydrogen-storing alloys, the high-frequency melting, arc melting, gas atomizing method, sputtering, mechanical alloying, molten-salt electrolysis and such other processes can be adopted.

(Preparation of a Magnesium-nickel Hydrogen-storing Alloy)

In the present invention, a magnesium-nickel alloy can be preferably employed as one of hydrogen-storing alloys. For the preparation of such an alloy, the following methods are included, in addition to the mechanical alloying, mechanical grinding, gas atomizing method, high-frequency melting, arc melting, sputtering, molten-salt electrolysis and the like as mentioned above.

By dipping magnesium powder into a solution obtained by dissolving a nickel salt in a solvent, magnesium element of higher ionization tendency can be substituted with nickel element of lower ionization tendency and a hydrogen-storing magnesium-nickel alloy is prepared by a further heat treatment.

As a solvent for dissolving the above nickel salt, alcohols such as ethyl alcohol are more suitable because magnesium reacts with water.

As another method for preparing a magnesium-nickel alloy, a magnesium-nickel alloy can be prepared with the reduction of nickel hydroxide after depositing the nickel hydride to magnesium powder.

As still another preparation method, after the mixing of magnesium powder and nickel formate, a nickel-magnesium alloy can be prepared by decomposing nickel formate at about 250° C. in the hydrogen flow or under vacuum and a further heating at such a high temperature as 400° C. or so.

The magnesium-nickel alloy prepared by the above technique is characterized in that the nickel ratio of the surface portion is preferably higher than that of the center portion.

Besides, a part of magnesium of the obtained magnesium-nickel alloy can be substituted with titanium, beryllium, aluminum, manganese, zinc, chromium, iron, indium, cobalt, molybdenum, tin, lead, antimony, bismuth, copper, silver, palladium or platinum as a metal having a smaller ionization tendency than magnesium. The substitution becomes possible by dipping magnesium-nickel alloy powder into a solution of a salt of the element having a smaller ionization tendency than magnesium as mentioned above. Needless to say, also by adding the above substitutional element salt to the above nickel salt solution and dipping magnesium powder in the obtained solution to effect a chemical reaction, the magnesium-nickel alloy powder having a part of magnesium element substituted with an element as mentioned above can be obtained.

With the above magnesium-nickel alloy, the element ratio of magnesium to nickel preferably ranges from 0.8 to 2.2 to obtain a large hydrogen-storing power.

The heat treatment temperature for the preparation of the above magnesium-nickel alloy is preferably within a range of 100 to 600° C. Besides, the above heat treatment step is preferably performed in the atmosphere comprising one gas or more selected from nitrogen gas, argon gas, helium gas and hydrogen gas or under a reduced pressure. Furthermore, to activate the surface, it is preferable to appropriately apply the plasma treatment.

In addition, when the magnesium-nickel alloy powder is caused to pass through a grinding process for adjusting the grain size, it is preferable to grind it in an atmosphere containing an inert gas or hydrogen gas.

As the magnesium-nickel alloy, one made amorphous by mixing grinding (mechanical grinding) under application of the centrifugal force is high in hydrogen storing power at a low temperature and too many spaces is preferable.
(Fabrication of an Electrode Member/negative Electrode)

As the preparation of an electrode member electrode, e.g., having the structure shown in FIG. 2, by using a powdery material comprising the above hydrogen-storing compound, two roughly classified methods can be employed: one by adding a auxiliary conductive material to the powdery material and sintering the mixture on a collector or the other by having the powdery material bounded on a collector with a binding agent.

As the above collector, a foamed metal obtained by coating the surface of a sheet-shaped polymer resin having a three dimensional network structure of foamed urethane or the like with a metal film of nickel or the like by the plating or other techniques and by the decomposing removal of the resin through firing, a foamed metal obtained by coating a felt of carbon fiber with a metal film of nickel or the like by the plating or other techniques, a non-woven cloth of a metal fiber such as nickel fiber, a sintered product of nickel fine powder, a punching metal or expanded metal of nickel or a nickel-plated perforated thin copper sheet, a nickel foil, a nickel-plated metal foil and such others are employed.

As the above binding agent, a polyolefin such as polyvinyl alcohol, polyvinyl chloride, polyethylene or polypropylene, fluororesin such as polyvinylidene fluoride or tetrafluoroethylene polymer, celluloses such carboxymethylcellulose can be included.

Concerning such electrode members, especially to reduce the impedance as a negative electrode by raising the packing density in a negative electrode active material layer to enhance the collecting power, at least two powder materials of different shapes selected from flakes, circles, filaments, needles, spikes and such others are employed as shapes of the auxiliary conductive materials in the present invention.

As the above auxiliary conductive materials, one material or more selected from a carbonaceous material such as amorphous carbon and graphite, nickel, copper, silver, indium and tin can be employed. (Surface coating of nickel hydroxide powder)

In a powdery material as shown in FIG. 3, the surface of nickel hydroxide (Ni(OH)$_2$) powder is preferably coated with a compound higher in conductivity than nickel hydroxide containing one element or more selected from lithium, potassium, manganese, aluminum, zinc, magnesium, molybdenum, tungsten, vanadium and titanium, higher in conductivity than nickel hydroxide, at a ratio of 0.5 atomic % to 10 atomic % and comprising one element or more selected from cobalt and nickel elements and oxygen element, or a compound higher in conductivity than nickel hydroxide comprising one element or more selected from molybdenum, tungsten, vanadium and titanium, and oxygen and hydrogen elements.

The compound comprising at least one element selected from molybdenum, tungsten, vanadium and titanium, and oxygen and hydrogen elements is preferably made a compound oxide by addition of aluminum and/or silicon element to improve alkali resistance.

As specific coating methods, the following types are included.

If coated with a compound comprising cobalt, oxygen element and lithium, (d) as a step of coating the surface of the nickel hydroxide powder mainly composing the positive electrode, on dispersing nickel hydroxide powder into a solution of a salt of one element or more selected from lithium, potassium, manganese, aluminum, zinc, magnesium, molybdenum, tungsten, vanadium and titanium added to a cobalt salt solution and then allowing the mixed solution to react with an alkali such as lithium hydroxide and potassium hydroxide, the nickel hydroxide powder coated with a cobalt hydroxide compound which contains an element selected from lithium, potassium, manganese, aluminum, zinc, magnesium, molybdenum, tungsten, vanadium and titanium can be prepared. As the above cobalt salts to be reacted with, one salt or more selected from cobalt nitrate, cobalt chloride and ammonium cobalt chloride are included.

Substitution of a cobalt salt with a nickel salt will provide the nickel hydroxide powder coated with nickel hydroxide containing the additive element mentioned above.

(e) After dipping nickel hydroxide powder into a saturated solution of cobalt hydroxide dissolved in aqueous ammonium and adding lithium hydroxide to the solution, the nickel hydroxide powder coated with lithium hydroxocobaltate (II) comprising cobalt, oxygen, hydrogen and lithium elements can be obtained by boiling.

On using potassium hydroxide in place of lithium hydroxide, the nickel hydroxide powder coated with hydroxocobaltate (II) of potassium can be obtained. Alternatively, adding salts of one element or more selected from lithium, potassium, manganese, aluminum, zinc, magnesium, molybdenum, tungsten, vanadium and titanium as with the above (d) prior to the addition of an alkali such as lithium hydroxide, the nickel hydroxide powder coated with hydroxocobaltate (II) containing these additional elements can be obtained.

(f) After cobalt nitrate and an organic acid salt of an alkali metal such as lithium acetate or lithium citrate easily decomposable at relatively low temperatures of about 100° C. are mixed with nickel hydroxide powder, the nickel hydroxide powder coated with a compound comprising cobalt, oxygen and alkali metal elements can be obtained by heating the mixture to a temperature at which cobalt nitrate and the organic acid salt are decomposed.

Alternatively, when nickel nitrate is used in place of cobalt nitrate, the nickel hydroxide powder coated with a compound comprising nickel element, oxygen element and an alkali metal element such as lithium can be obtained.

As methods for coating the surface of nickel hydroxide powder with a compound comprising one element or more selected from molybdenum, tungsten, vanadium and titanium and oxygen and hydrogen elements, the following methods are included. The examples (g) and (h) referred to below relate to methods for preparing the nickel hydroxide coated with a compound comprising tungsten and oxygen and hydrogen elements.

(g) By allowing an aqueous solution of an alkali metal salt such as sodium tungstenate Na$_2$WO$_4$ to pass through a strongly acidic cation exchange resin column and exchanging sodium ions in the aqueous solution with hydrogen ions, an aqueous tungstic acid solution is obtained. Nickel hydroxide powder is dispersed into the aqueous tungstic acid solution obtained, the hydrogen-storing alloy powder with gelified tungstic acid adhered thereto is separated, dried and heat-treated after the standing and the nickel hydroxide coated with a tungstenate gel layer comprising a tungsten oxide can be obtained.

(h) Aqueous Hydrogen peroxide is added to metal tungsten powder or tungsten carbide powder, reaction is allowed to conclude and after the completion of reaction, an excess of hydrogen peroxide is decomposed by using a platinum catalyst to prepare a solution of peroxopolytungstic acid ($2WO_3H_2O_2.nH_2O$). Nickel hydroxide powder is dispersed into the prepared peroxopolytungstic acid solution obtained, the nickel hydroxide powder with peroxopolytungstic acid adhered thereto is separated, dried and heat-treated after standing and the nickel hydroxide powder coated with a peroxopolytungstic acid layer can be obtained.

Also for the preparation of the hydrogen-storing alloy powder coated with other oxides than that of tungsten, oxides of molybdenum, vanadium, niobium and titanium in the above methods (g) and (h), the above-mentioned technique can be adopted.

Incidentally, in place of sodium tungstenate $Na_2WO_4$ in the above (g), lithium tungstenate $Li_2WO_4$, potassium tungstenate $K_2WO_4$, sodium molybdenate $Na_2MoO_4$, lithium molybdenate $Li_2MoO_4$, potassium molybdenate $K_2MoO_4$, sodium metavanadate $NaVO_3$, lithium metavanadate $LiVO_3$, potassium metavanadate $KVO_3$, sodium niobate $NaNbO_3$, lithium niobate $LiNbO_3$ and potassium niobate $KNbO_3$ can be also used.

In place of tungsten W and tungsten carbide WC in the above (h), molybdenum Mo, molybdenum carbide MoC, vanadium V, vanadium carbide VC, niobium Nb, niobium carbide NbC, titanium Ti and titanium carbide TiC may also be used.

Besides, as another method for coating nickel hydroxide powder with an oxide layer of vanadium, amorphous vanadium oxide is formed by quenching the vanadium pentaoxide $V_2O_5$ crystal molten at high temperatures, nickel hydroxide powder is dispersed either into the sol solution prepared by dissolving this into water or into the sol solution prepared by flowing of molten vanadium pentaoxide into water and separated and dried after standing, the nickel hydroxide powder covered with a vanadic acid gel layer of oxides of vanadium can be obtained. This technique is applicable to niobium, where niobium pentaoxide $Nb_2O_5$ is used.

To make the above nickel hydroxide coated with a compound comprising one element or more selected from molybdenum, tungsten and vanadium and oxygen and hydrogen elements difficult to dissolve in the alkali used for the electrolyte of a cell, the nickel hydroxide powder is further coated with a compound comprising cobalt and oxygen element, or with a compound comprising nickel and oxygen element, or with a compound comprising at least one element selected from aluminum and silicon, and oxygen element, or with a nickel metal thin film can be adopted.

(Fabrication of Electrode Member/positive Electrode)

The above nickel hydroxide powder subjected to the coating treatment is mixed with a binding agent, a solvent is added to the mixture to prepare a slurry and the slurry is filled into a porous collector, or the nickel hydroxide powder is bonded directly to a collector by using a binding agent, with the result that an electrode member employed as the positive electrode in a secondary cell is fabricated.

The collector serves to efficiently supply the current consumed or to collect the current generated in the electrode reactions during the charging and discharging. Thus, as the material forming the collector, one which is high in conductivity and inactive to the cell reaction is desirable.

As the above porous collector, a foam metal obtained by coating the surface of a sheet-shaped polymer resin having a three dimensional network structure of foam urethane or the like with a metal film of nickel or the like by the plating or other techniques and by the decomposing removal of the resin through firing, a foam metal obtained by coating a felt of carbon fiber with a metal film of nickel or the like by the plating or other techniques, a non-woven cloth of a metal fiber such as nickel fiber, a sintered product of nickel fine powder, a punching metal or expanded metal of nickel or a nickel-plated perforated thin copper sheet, a nickel foil, a nickel-plated metal foil and such others are employed.

As the above binding agent, a polyolefin such as polyvinyl alcohol, polyvinyl chloride, polyethylene or polypropylene, fluoro resin such as polyvinylidene fluoride or tetrafluoroethylene polymer, celluloses such as carboxyl methyl cellulose and such others are included.

Besides, after the slurry prepared by mixing nickel powder and a binding agent solution is applied to a nickel-plated, perforated copper sheet without use of a powdery material serving as the positive electrode active material according to the present invention, a sintered nickel substrate obtained by the sintering is dipped into a nickel salt solution to fill a nickel salt and is allowed to react with an alkali solution to form nickel hydroxide in accordance with a conventional technique and then by combining a positive electrode made of the sintered nickel substrate having nickel hydroxide packed therein with a negative electrode using the powdery material according to the first aspect of the present invention, a secondary cell according to the present invention can be constructed.

As mentioned above, nickel (II) nickel (III) hydroxide $Ni_3O_2(OH)_4$ is preferably mixed with the above nickel hydroxide ($Ni(OH)_2$) powder to form an electrode member (positive electrode). Since nickel (II) nickel (III) hydroxide $Ni_3O_2(OH)_4$ is smaller in density than nickel hydroxide ($Ni(OH)_2$), too great a mix amount would lead to a decrease in the amount of the active material packed in the positive electrode and accordingly the mix amount preferably ranges from 1% by weight to 30% by weight and more preferably ranges from 2% by weight to 20% by weight. In the alkali secondary cell using the electrode member formed by mixing nickel (II) nickel (III) hydroxide $Ni_3O_2(OH)_4$ with nickel hydroxide ($Ni(OH)_2$) as the positive electrode, hydrogen atoms are added to nickel (II) nickel (III) hydroxide $Ni_3O_2(OH)_4$ having higher valent nickel atoms and nickel atoms are reduced to lower valent nickel atoms during the discharging. Thus, by using a positive electrode having the above nickel (II) nickel (III) hydroxide added, a secondary cell larger in capacity can be obtained than an alkali secondary cell using the positive electrode formed of nickel hydroxide $Ni(OH)_2$ having only divalent nickel element as only a single active material.

As one example of method for preparing nickel (II) nickel (III) hydroxide, a method of allowing an aqueous solution of nickel nitrate to react with bromine and an alkali hydroxide is included. Other examples include a preparing method by mixing an alkali peroxide and an alkali hydroxide with metal nickel, allowing the reaction to proceed at a temperature of about 600° C. and washing the product with ice water.

(Shapes and Structures of a Battery)

A secondary cell according to the present invention is, for example, flat, cylindrical, rectangular parallelepiped (box-type), sheet-shaped or the like. Its structure is single-layered, multi-layered, spiral or the like. Above all, a spiral-structured cylindrical cell is characterized in that the electrode area can be increased by interposing a separator between the negative electrode and the positive electrode and rolling in the electrodes and a large current can flow during the charging and discharging. And, rectangular parallelepiped and sheet-shaped cells are characterized in that an effective use can be made of the admission space of devices for housing a cell.

Figure 6:
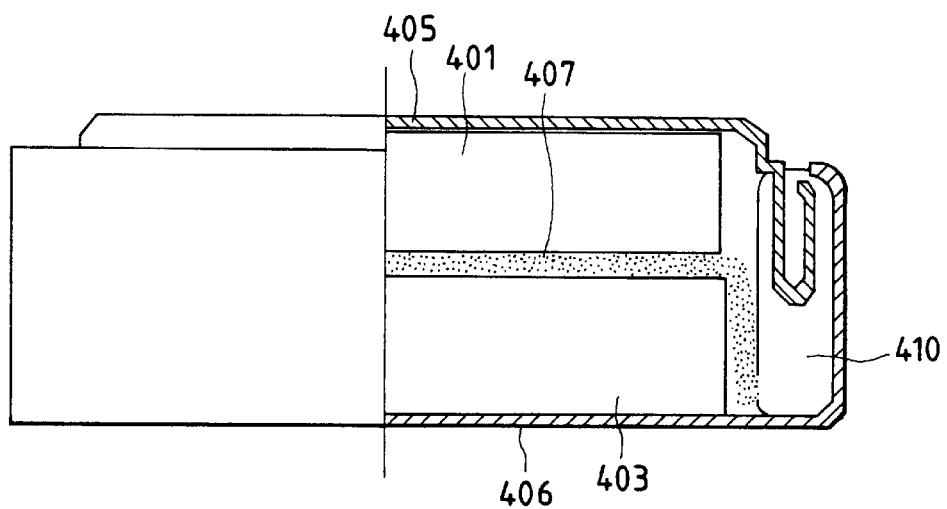
FIG. 6 is a sectional view of an example of a coin-shaped cell.
Figure 7:
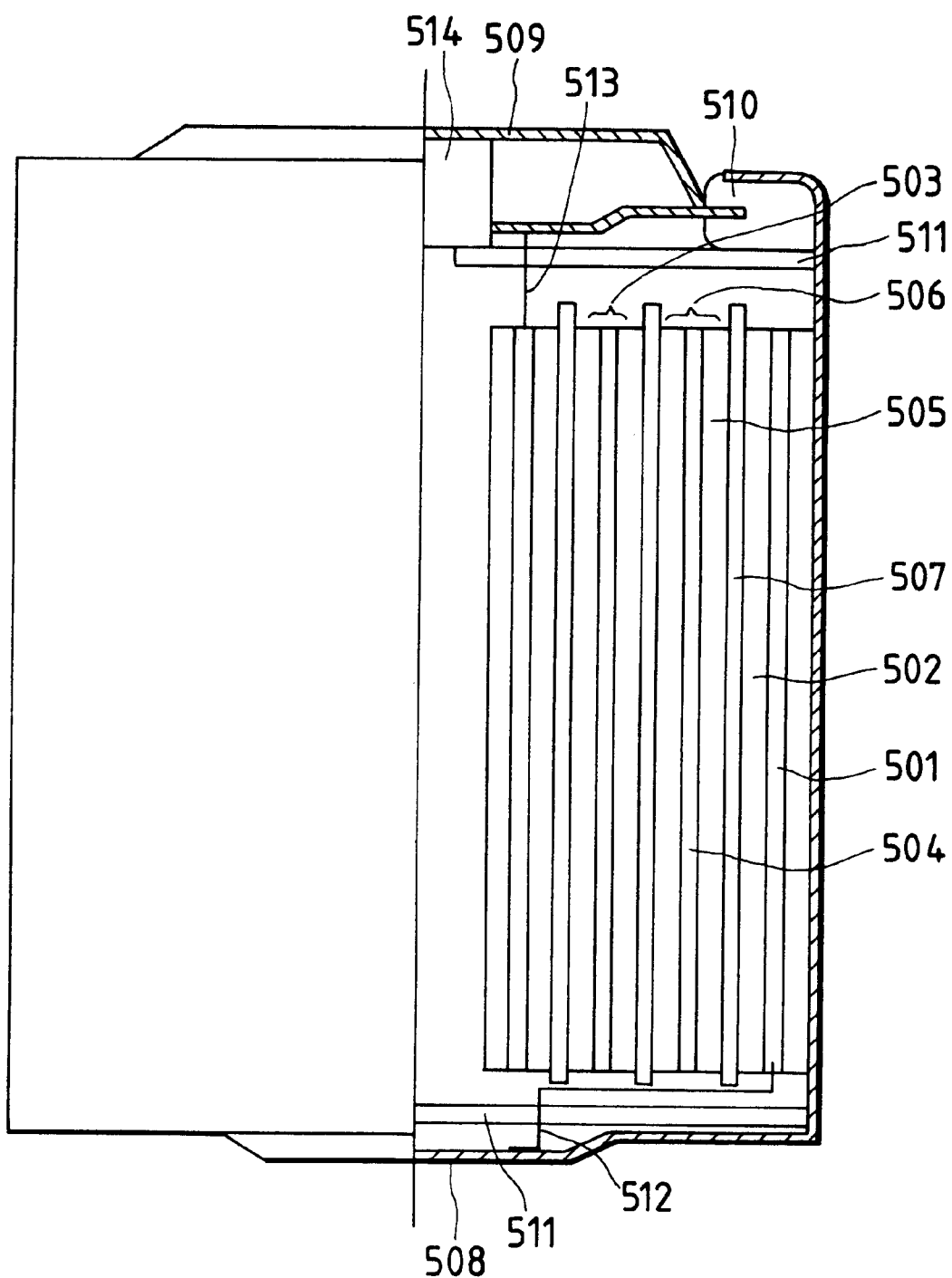
FIG. 7 is a sectional view of an example of a spiral type cylindrical cell.
Figure 8:
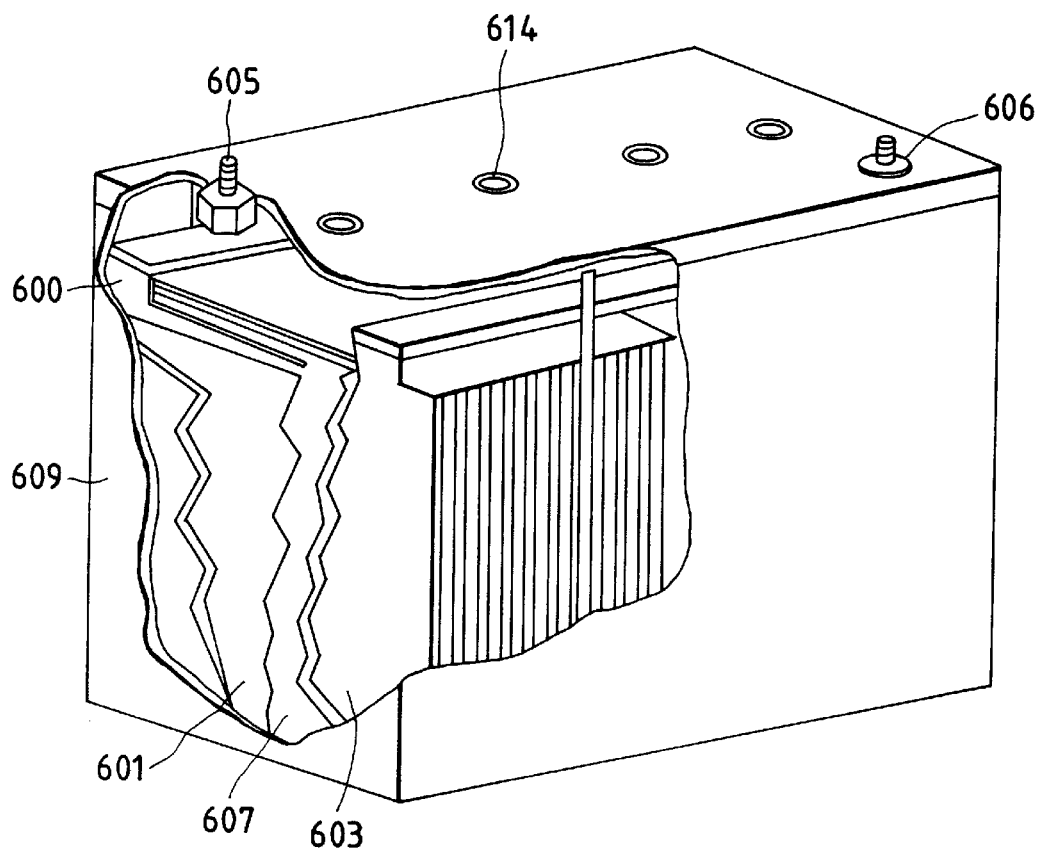
FIG. 8 is a sectional view of an example of a rectangular shaped cell.

Hereinafter, referring to FIGS. 6, 7 and 8, practical examples of cells in shape and structure will be described in more detail. FIG. 6 is a sectional view of a single-layered flat (coin-shaped) cell, FIG. 7 is a sectional view of a spiral-structured cylindrical cell and FIG. 8 is a sectional view of a rectangular parallelepiped cell. These secondary cells are basically similar in construction to that of FIG. 5 and comprises a negative electrode, a positive electrode, an electrode/separator, a battery housing, output terminals and so on.

In FIGS. 6, 7 and 8, Numerals 401, 503 and 601 denote negative electrodes comprising a negative electrode active material layer Numerals 403, 506 and 603 denote positive electrodes comprising a positive electrode active material layer; Numerals 405, 508 and 605 denote negative electrode terminals (negative electrode caps or negative electrode cans); Numerals 406, 509 and 606 denote positive electrode terminals (positive electrode caps or positive electrode cans); Numerals 407, 507 and 607 denote separators. electrolytes; Numerals 410 and 510 denote gaskets; Numerals 501 and 600 denote negative electrode collectors; Numerals 504 and 511 denote a positive electrode collector and an insulating plate; Numerals 512 and 513 denote a negative electrode lead wire and a positive electrode wire; Numerals 514 and 614 denote safety valves; and Numeral 609 denotes a battery housing (battery jar). With the flat (coin-shaped) secondary cell shown in FIG. 6, a positive electrode 403 comprising a positive electrode active material (active material layer) and a negative electrode 401 comprising a negative electrode active material (active material layer) is stacked at least via a separator 407 retaining an electrolyte (electrolyte solution), this stack is housed in a positive electrode can 406 as the positive electrode terminal from the positive electrode side and the negative electrode side is coated with a negative electrode cap 405 as the negative electrode terminal. A gasket 410 is disposed at another part in the positive electrode can 406. With the cylindrical lithium secondary cell shown in FIG. 7, a positive electrode 506 comprising a positive electrode active material layer (active material layer) 505 formed on a positive electrode collector 504 and a negative electrode 503 comprising a negative electrode active material layer (active material layer) 502 formed on a negative electrode collector 501 sandwich at least a separator 507 retaining an electrolyte (electrolyte solution) between themselves and the spiral-structured stack wound at multiple times around a predetermined axis is housed in a negative electrode can 508 from its the lateral side and one base side. Besides, the other base (top) side is covered with a positive electrode terminal (positive electrode cap) 509. And at the other part in the negative electrode can, an insulator (gasket 510 ) is disposed. The spiral-structured electrode stack is isolated from the positive electrode cap 509 side via an insulating plate 511. The negative electrode 503 is connected via a negative electrode lead wire 512 to the negative electrode can 508, whereas the positive electrode 506 is connected via a positive electrode lead wire 513 to the positive electrode cap 509. On the positive electrode cap side 509, a safety valve 514 for adjusting the internal pressure inside the battery is provided.

Hereinafter, one example of method for assembling the batteries shown in FIGS. 6 and 7 will be described.

(1) The separator (407, 507) sandwiched between the negative electrode (401, 503) and the positive electrode (403, 506) is incorporated into the positive electrode can (406) or the negative electrode can (508);

(2) After the electrolyte solution is injected, an insulating packing (410, 510) is assembled together with the negative electrode cap (405) or the positive electrode cap (509); and (3) By caulking the above (2), the battery is brought to completion.

Incidentally, the material preparation and the assembling of the above secondary cell are desirably performed in dry air from which moisture is removed sufficiently or in a dry inertia gas.

With the example of rectangular parallelepiped battery shown in FIG. 8, a plurality of unit cells each comprising a negative electrode 601/a separator containing an electrolyte (electrolyte solution) 607/ a positive electrode 603 are stacked via separators, connected in parallel and housed in a battery housing (battery case) 609. The negative electrode 601 and the positive electrode 603 are connected to a negative electrode terminal 605 and to a positive electrode terminal 606, respectively. Furthermore, in the battery housing 609, a safety valve 614 for adjusting the internal pressure is provided.

Hereinafter, one example of method for assembling the battery shown in FIG. 8 will be described.

(1) After a plurality of unit cells each comprising a negative electrode 601, a separator 607 and a positive electrode 603 are stacked via separators and connected in parallel through a collector, they are incorporated in a battery housing (battery jar) 609.

(2) After the negative electrode terminal 605 and the positive electrode terminal 606 are connected to the respective collectors of electrodes, an electrolyte is injected.

(3) By putting a lid onto the battery jar 609 and sealing it, the battery is brought to completion.

Next, the arrangement of members in the above-mentioned examples of secondary cells will be decribed.
(Electrolyte)

With secondary cells using the electrode member as mentioned above, the electrolyte solution made by dissolving an electrolyte into a solvent is used while allowing it to be retained in a porous separator.

The conductivity of the electrolyte is required to be preferably not less than $1\times10^{-3}$ S/cm and more preferably not less than $5\times10^{-3}$ S/cm at 25° C.

As the electrolyte, potassium hydroxide, lithium hydroxide, sodium hydroxide and their mixtured salts are included. Generally, an aqueous alkaline solution made by dissolving the above electrolyte into water are used as the electrolyte solution.

To prevent the leakage of the above electrolyte solution, their gelification is preferable. As the gelifying agent, those polymers which absorb the solvent of the electrolyte to swell are desirably used. As such polymers, polyethylene oxide, polyvinyl alcohol, polyacryl amide and the like are employed.
(Separator)

The separator used in a secondary cell according to the present invention serve to prevent the short-circuit between a negative electrode and a positive electrode. Besides, they may serve to hold an electrolyte solution.

The separator is required to have pores through which hydrogen ions can move and to be insoluble and stable in an electrolyte solution. Accordingly, as the separator, for example, non-woven cloth of glass, polyolefin such as polypropylene or polyethylene, fluororesin, polyimide or the like or micropore-structured materials are appropriately employed. The separators of the materials such as polyolefin or fluororesin as mentioned above are preferably hydrophilified to raise the wettability to an electrolyte solution. The hydrophilification treatment can be simply accomplished with a treatment by the irradiation of a plasma such as hydrogen plasma, oxygen plasma and fluorine plasma, an ozone irradiation treatment, a corona discharge treatment, or a treatment by chemicals.

Besides, a metal oxide film having pores or a resin film made composite with a metal oxide may be employed.

(Battery Housing (Battery Jar))

As the housing (battery jar) of an alkali secondary battery according to the present invention in a case where the output/input terminals of the battery serves also as the battery housing (battery jar), that is, as the materials of the members 405, 406, 508 and 509 of the cells shown in FIGS., 6 and 7, a copper sheet or a stainless steel sheet is appropriately employed. Especially, a titanium-clad stainless steel sheet, a cooper-clad stainless steel sheet, a nickel-plated capper sheet or the like is frequently employed.

In the case of the battery housing (jar) 609 shown in FIG. 8 where the input/output terminals of a battery does not serve also as the battery housing, examples of the materials for such a battery housing (jar) include not only a stainless steel but also a metal such as zinc, plastic such as polypropyrene or a composite material of metal or glass fibers with plastics.

(Safety Valve)

As safety measures for the time of elevated internal pressure of a battery, a safety valve (514, 614) is provided in a secondary cell according to the present invention. As a safety valve, for examples, rubber, a spring, a metal ball, a rupture foil or the like is employed.

(Gasket)

As members of gaskets (410, 510) in the present invention, for example, fluorine resin, polyamide resin, polysulfone resin or various types of rubbers may be employed. As a sealing method of batteries, not only 'caulking' using a gasket as shown in FIGS. 6 and 7 but also a method using a tube sealing with glass, an adhesive, welding, soldering or the like is employed.

Besides, as the material for the insulating plate of the structure shown in FIG. 7, various organic resin materials or ceramics are employed.

Hereinafter, referring to Examples, the present invention will be described in detail. Incidentally, the present invention is not limited to these examples.

Methods for preparing a powdery material comprising a hydrogen-storing compound of a negative electrode active material serving as the main material of the negative electrode of a secondary cell, methods for forming an electrode member (negative electrode) according to the present invention, surface treatment methods of a powdery material employed as a positive electrode active material serving as the main material of the positive electrode of a secondary cell, methods for forming an electrode member (positive electrode) according to the present invention and the preparation of a secondary cell according to the present invention are described referring to the respective examples in Examples 1 to 4, in Examples 5 to 10, in Examples 11 to 15, in Examples 16 to 20 and in Examples 21 to 38. Incidentally, in these examples and comparative examples, AA-sized cylindrical batteries similar to that shown in FIG. 7 were prepared.

[Preparation of Hydrogen-storing Alloy Powder]

EXAMPLE 1

(1) Preparation of Hydrogen-storing Alloy Powder Employed as the Core

Magnesium powder of not greater than 80 mesh size was dipped into an ethanol solution containing nickel chloride dissolved so as to attain a ratio of nickel element to magnesium element of 1:1 and further containing cobalt chloride and cupric chloride dissolved so as to attain 2 atomic % and 1 atomic % with regard to magnesium element and a reaction was allowed to proceed at 50° C. under irradiation of ultrasonic waves of 37 kHz with an ultrasonic cleaner to replace magnesium element in the magnesium powder with nickel, cobalt and copper elements. By treating the obtained powder at 350° C. in a hydrogen gas flow, the magnesium-nickel alloy powder containing traces of cobalt element and copper element was obtained.

As a result of a quantitative analysis of the nickel element in the depth direction with argon etching using the scanning Auger microanalyzer of the thus obtained magnesium-nickel alloy powder and of the averaged elemental ratios of magnesium element to nickel element as estimated by the plasma emission spectroscopy of the above magnesium-nickel alloy powder, it was found that the ratio of nickel element was higher in the surface than in the center portion.

(2) Coating of Hydrogen-storing Alloy Powder with a Metal Oxide i) Titanium powder of not greater than 100 mesh size was added little by little to aqueous hydrogen peroxide cooled with ice and allowed to react therewith, and after the completion of reaction, the remaining hydrogen peroxide was decomposed by using a platinum mesh to prepare an aqueous solution of peroxopolytitanic acid. The magnesium-nickel alloy powder as obtained in the above (1) was dispersed into the above obtained peroxopolytitanic acid solution and allowed to stand for 30 minutes. After separation, the product was washed with cool water and heat-treated at 150° C. after drying. By this, magnesium-nickel alloy powder coated with a peroxopolytitanic acid film (film thickness: 0.5 $\mu$m) as a composed of titanium and oxygen element was obtained.

ii) Next, after the compound powder obtained in the i) was dispersed into an aqueous solution of nickel chloride and cobalt chloride, the solution was stirred so that the powder adsorbed nickel chloride and cobalt chloride. The powder was separated and dispersed into an aqueous solution of sodium hydroxide to react the nickel chloride and cobalt chloride adsorbed to the surface of the peroxopolytitanic acid film with the sodium hydroxide, thereby depositing nickel hydroxide and cobalt hydroxide. After water washing and drying, the nickel hydroxide-cobalt hydroxide was reduced by the heat treatment in a hydrogen gas flow at 300° C. to obtain compound powder comprising a core of a magnesium-nickel alloy coated with a compound of titanium and oxygen element and having metallic nickel and cobalt dispersed and carried on the outermost surface in a thickness of about 30 nm.

On the analysis of the compound powder obtained in ii) by the scanning Auger microanalyzer, it was confirmed that the compound powder was almost coated with titanium and oxygen element and that nickel and cobalt elements were dispersed on the outermost surface.

EXAMPLE 2

(1) Preparation of Hydrogen-storing Alloy Powder Employed as the Core

Magnesium powder of not greater than 80 mesh size was mixed with nickel powder not greater than 1 $\mu$m in average particle size so as to attain the elemental ratio of 1:1 relative to the magnesium element and the mixture was ground by using a planetary ball mill for 20 hours to obtain magnesium-nickel alloy powder. (The obtained alloy was confirmed to be amorphous using the X-ray diffraction analysis.) The obtained powder was treated at 100° C. in a hydrogen gas flow.

(2) Coating of Hydrogen-storing Alloy Powder with a Metal Oxide i) Aqueous hydrogen peroxide was allowed to react with molybdenum carbide powder of not greater than 100 mesh size, and after the completion of the reaction, the remaining hydrogen peroxide was decomposed by using a platinum mesh to prepare an aqueous solution of peroxopolymolybdic acid. To this was added a sol solution prepared by dissolving aluminum nitrate in 1,3-butanediol and heating to 90° C. and the magnesium-nickel alloy powder obtained in the above (1) was dispersed into this solution. After standing and separation, the product was washed with cool water and was heat-treated at 150° C. after the drying. By this, the product comprising a core of magnesium-nickel alloy coated with a compound of molybdenum, aluminum and oxygen element was obtained.

ii) Next, the compound powder obtained in the i) was dispersed into an aqueous solution of nickel formate and mixed. After the drying, the nickel formate was decomposed by the treatment in a hydrogen gas flow at 250° C. to obtain the compound powder comprising a core of a magnesium-nickel alloy coated with a compound of molybdenum, carbon and oxygen element and having metallic nickel dispersed and carried on the outermost surface in a thickness of about 10 nm.

On the analysis by the scanning Auger microanalyzer, it was confirmed that the compound powder obtained in ii) was almost coated with tungsten and oxygen elements and nickel element was dispersed on the outermost surface.

EXAMPLE 3

(1) Preparation of Hydrogen-storing Alloy Powder Employed as the Core

In order that a Mischmetal (Mm) alloy MmNi3.6Mn0.4Al0.3CoO.7 could be obtained, misch metal powder having the composition of La (30%), Ce (40%), Pr (4%), Nd (14%), and Fe (5%), nickel powder, manganese powder, aluminum powder and cobalt powder were mixed. The mixture was then melted by a high frequency furnace in an atmosphere of argon gas to prepare an alloy. The obtained alloy was ground in an atmosphere of argon gas to obtain alloy powder not greater than 20 μm in average particle size.

(2) Coating of Hydrogen-storing Alloy Powder with a Metal Oxide i) The hydrogen-storing alloy powder prepared in the above (1) was dipped in an ethanol solution of tetra-n-propoxy titanium and ethoxy lithium dissolved at a molar ratio of 10:1. After separation, the powder was subjected to dry hydrolysis in air and heat-treated at 250° C. Thereby, the product comprising a core of hydrogen-storing alloy coated with a film of a compound (titanium oxide) of titanium and oxygen element containing lithium was obtained.

ii) Next, the compound powder obtained in the i) was dipped into an ethanol solution of molybdenum dichloride so that molybdenum dichloride could be adsorbed to the powder and then separated and dispersed into an ethanol solution of sodium hydroxide to react the molybdenum chloride adsorbed to the surface of the titanium oxide film with the sodium hydroxide to deposit molybdenum oxide. After water washing and drying, the molybdenum oxide was reduced by the treatment in a hydrogen gas flow at 400° C. to obtain the compound powder comprising a core of the hydrogen-storing alloy of the above (1) coated with titanium oxide (thickness: 50 nm) containing lithium element and having metallic molybdenum dispersed and carried on the outermost surface in a thickness of about 5 nm.

On the analysis by the scanning Auger microanalyzer, it was confirmed that the compound powder obtained in ii) was almost coated with titanium element and oxygen element and that metallic molybdenum element were dispersed on the outermost surface.

EXAMPLE 4

(1) Preparation of Hydrogen-storing Alloy Powder Employed as the Core

In order that a transition metal alloy Zr0.9Ti0.1Ni1.1CoO.1MnO.6VO.2 was obtained, zirconium powder, titanium powder, nickel powder, cobalt powder, manganese powder and vanadium powder having the above compositional ratio were mixed and then melted by means of an arc in the atmosphere of argon gas to prepare the alloy. After the heat treatment at 1100° C. under vacuum, the obtained alloy was ground in the atmosphere of argon gas to thus obtain alloy powder not greater than 50 μm in average particle size.

(2) Coating of Hydrogen-storing Powder with a Metal Oxide i) After a silica sol solution prepared by the sol-gel process using tetraethoxysilane as the starting material was added to an aqueous solution of ammonium paratungstate and lithium hydroxide dissolved at a molar ratio of 10:1, the hydrogen-storing alloy powder prepared in the above (1) was dipped and heat-treated at 600° C. in a hydrogen gas flow to thus obtain the hydrogen-storing alloy powder having the surface coated with a tungsten-silicon oxide layer containing lithium (layer thickness: 0.1 μm).

ii) Next, the compound powder obtained in the i) was dipped into an aqueous solution of nickel nitrate, cobalt nitrate and copper nitrate dissolved at a molar ratio of 3:2:5, separated and dispersed into an aqueous solution of sodium hydroxide to react the nickel nitrate, cobalt nitrate and copper nitrate adsorbed to the surface of the tungsten oxide film with the sodium hydroxide, thereby depositing hydroxides comprising nickel hydroxide, cobalt hydroxide and copper hydroxide. After water washing and drying, the hydroxides were reduced by the treatment in the hydrogen gas flow at 180° C. to thus obtain the compound powder comprising a core of the hydrogen-storing alloy of the above (1) coated with lithium-contained tungsten-silicon oxide containing lithium element and having metallic nickel, cobalt and copper dispersed and carried on the outermost surface in a thickness of about 10 nm.

On the analysis by the scanning Auger microanalyzer, it was confirmed that the compound powder obtained in ii) was almost coated with tungsten element and oxygen element and that metallic nickel, cobalt and copper element were dispersed on the outermost surface.

Comparative analysis of the hydrogen-storing alloy powder employed in the core layer of Examples 1, 2, 3 and 4 (powder not coated with an oxide layer and having no metal element dispersed) and the hydrogen-storing compound powder obtained in Examples 1, 2, 3 and 4 by the gas chromatography concerning the ratio of hydrogendeuterium (HD) separately generated by the hydrogen-deuterium exchange reaction in the 1:1 atmosphere of hydrogen ($H_2$) and deuterium ($D_2$) at less than 1 atm reveals that the compound powder obtained in the Examples each generates a greater amount of hydrogendeuterium than the alloy powder having no coating layer and dispersed metal and was therefore larger in the activity of the hydrogen-deuterium exchange reaction. This suggests that the compound powder obtained in the examples is more likely to generate atomic hydrogen.

[Formation of Electrode Members (Negative Electrode)]

EXAMPLE 5

The hydrogen-storing compound powder obtained in Example 1 was mixed with 2 weight ratio of flake-like nickel powder, 15–20 μm in average particle size, 0.8 weight ratio of spiky nickel powder, 3–7 μm in average particle size, and 0.2 weight ratio of filament-shaped nickel powder, 0.8 μm in average particle size as the auxiliary conductive materials, and 3% by weight of polyvinyl alcohol on the compound powder basis under the addition of water to prepare a pasty mixture and the mixture was filled in a spongy nickel porous member of 95% porosity having an average pore size of 150 μm. After drying, the filled member was pressurized by using a roller press and cut to a predetermined size. To the cut member, a nickel lead wire was connected by the spot welding and an electrode member serving as the negative electrode of a secondary cell was obtained.

EXAMPLE 6

The hydrogen-storing compound powder obtained in Example 2 was mixed with 2 weight ratio of flake-like nickel powder, 15–20 μm in average particle size, 0.8 weight ratio of spiky nickel powder, 3–7 μm in average particle size, 0.2 weight ratio of filament-shaped nickel powder, 0.8 μm in average particle size as the auxiliary conductive materials, and 3% by weight of polyvinyl alcohol on the compound powder basis under the addition of water to prepare a pasty mixture and the mixture was applied to a nickel-plated steel sheet of punching metal and shaped. After drying, the shaped sheet was pressurized by using a roller press and cut to a predetermined size. To the cut member, a nickel lead wire was connected and an electrode member serving as the negative electrode of a secondary cell was obtained.

EXAMPLE 7

The hydrogen-storing compound powder obtained in Example 3 was mixed with 2 weight ratio of flake-like nickel powder, 15–20 μm in average particle size, 1 weight ratio of spherical copper powder, 1 μm in average particle size as the auxiliary conductive materials, and 3% by weight of polyvinyl alcohol on the compound powder basis under the addition of water to prepare a pasty mixture and the mixture was applied to a nickel-plated steel sheet of punching metal and shaped. After drying, the shaped sheet was pressurized by using a roller press and cut to a predetermined size. To the cut member, a nickel lead wire was connected and an electrode member serving as the negative electrode of a secondary cell was obtained.

EXAMPLE 8

The hydrogen-storing compound powder obtained in Example 4 was mixed with 2 weight ratio of flake-like nickel coated graphite powder, 85 μm in average particle size, 1 weight ratio of spherical nickel powder, 10 μm in average particle size as the auxiliary conductive materials, and 3% by weight of polyvinyl alcohol on the compound powder basis under the addition of water to prepare a pasty mixture and the mixture was filled in a spongy nickel porous member having a porosity of 95% and an average pore size of 150 μm. After drying, the filled member was pressurized by using a roller press and cut to a predetermined size. To the cut member, a nickel lead wire was connected and an electrode member serving as the negative electrode of a secondary cell was obtained.

EXAMPLE 9

The hydrogen-storing compound powder obtained in Example 4 was mixed with 2 weight ratio of flake-like nickel powder, 15–20 μm in average particle size and 1 weight ratio of spherical copper powder, 1 μm in average particle size as the auxiliary conductive materials on the compound powder basis, and the mixture was shaped to a nickel-plated steel sheet of punching metal under pressure. The sheet was sintered in the argon gas flow and cut to a predetermined size. To the cut member, a nickel lead wire was connected and an electrode member serving as the negative electrode of a secondary cell was obtained.

EXAMPLE 10

The hydrogen-storing compound powder obtained in Example 2 was mixed with 3 weight ratio of flake-like nickel powder, 15–20 μm in average particle size as the auxiliary conductive material, and 3% by weight of polyvinyl alcohol on the compound powder basis under the addition of water to prepare a pasty mixture and the mixture was applied to a nickel-plated steel sheet of punching metal and shaped. After drying, the shaped sheet was pressurized by using a roller press and cut to a predetermined size. To the cut member, a nickel lead wire was connected and an electrode member serving as the negative electrode of a secondary cell was obtained.

Comparative Example 1

Without carrying out the coating by oxide treatment and the transition metal element dispersion treatment as carried out in Example 1, magnesium powder and nickel powder were mixed at a molar ratio of 1:1 in an atmosphere of argon gas and the mixture was put in a graphite crucible of a high frequency melting furnace and melted in an argon gas atmosphere to obtain a hydrogen-storing alloy powder. Using the hydrogen-storing alloy powder obtained by the high-frequency melting as such, it was mixed with 3 weight ratio of flake-like nickel powder, 15–20 μm in average particle size as the auxiliary conductive material and 3% by weight of polyvinyl alcohol on the alloy powder basis under the addition of water to prepare a pasty mixture and the mixture was filled in a spongy nickel porous member having a porosity of 95% and an average pore size of 150 μm. After drying, the filled member was pressurized by using a roller press and cut to a predetermined size. To the cut member, a nickel lead wire was connected by the spot welding and an electrode member serving as the negative electrode of a secondary cell was obtained.

Comparative Example 2

Without carrying out the coating by oxide treatment and the transition metal element dispersion treatment as carried out in Example 2, that is, using the hydrogen-storing alloy powder used in the core layer as such, it was mixed with 3 weight ratio of flake-like nickel powder, 15–20 μm in average particle size as the auxiliary conductive material and 3% by weight of polyvinyl alcohol on the alloy powder basis under the addition of water to prepare a pasty mixture, and the mixture was applied to a nickel-plated steel sheet of punching metal and shaped. After drying, the shaped sheet was pressurized by using a roller press and cut to a predetermined size. To the cut member, a lead of nickel wire was connected and an electrode member serving as the negative electrode was obtained.

Comparative Example 3

Without carrying out the coating by oxide treatment and the transition metal element dispersion treatment as carried out in Example 3, that is, using the hydrogen-storing alloy powder used in the core layer as such, it was mixed with 3 weight ratio of flake-like nickel powder, 15–20 μm in average particle size as the auxiliary conductive material and 3% by weight of polyvinyl alcohol on the alloy powder basis under the addition of water to prepare a pasty mixture and the mixture was applied to a nickel-plated steel sheet of punching metal and shaped. After drying, the shaped sheet was pressurized by using a roller press and cut to a predetermined size. To the cut member, a lead of nickel wire was connected and an electrode member serving as the negative electrode was obtained.

Comparative Example 4

Without carrying out the coating by oxide treatment and the transition metal element dispersion treatment as carried out in Example 4, that is, using the hydrogen-storing alloy powder used in the core layer as such, it was mixed with 3 weight ratio of flake-like nickel powder, 15–20 μm in average particle size as the auxiliary conductive material and 3% by weight of polyvinyl alcohol on the alloy powder basis under the addition of water to prepare a pasty mixture and the mixture was filled in a spongy nickel porous member having a porosity of 95% and an average pore size of 150 μm. After drying, the filled member was pressurized by using a roller press and cut to a predetermined size. To the cut member, a lead of nickel wire was connected and an electrode member serving as the negative electrode was obtained.

Comparative Example 5

Without carrying out the coating by oxide treatment and the transition metal element dispersion treatment as carried out in Example 4, that is, using the hydrogen-storing alloy powder used in the core layer as such, it was mixed with 3 weight ratio of flake-like nickel powder, 15–20 μm in average particle size as the auxiliary conductive material and the mixture was shaped to a nickel-plated steel sheet of punching metal under pressure. The sheet was sintered in the argon gas flow and cut to a predetermined size. To the cut member, a lead of nickel wire was connected and an electrode member serving as the negative electrode was obtained.

[Preparation of Nickel Hydroxide Powder]

EXAMPLE 11

After 0.08 part of cobalt nitrate powder, 0.02 part of nickel nitrate powder and 0.01 part of lithium acetate powder are mixed with 1.0 part of nickel hydroxide powder, 10 μm in average particle size in terms of molar ratio, the mixture was gradually heated to 120° C. to obtain nickel hydroxide powder coated with a compound composed of cobalt, nickel, oxygen and lithium elements could be obtained.

Incidentally, the cobalt element, nickel element and oxygen element on the surface of the nickel hydroxide was confirmed by the elemental mapping with the scanning Auger microanalyzer. Further, the presence of the lithium element on the surface of the nickel hydroxide was confirmed by the plasma emission spectroscopy of an aqueous solution of the powdery material as separately obtained dissolved in hydrochloric acid.

Figure 9:
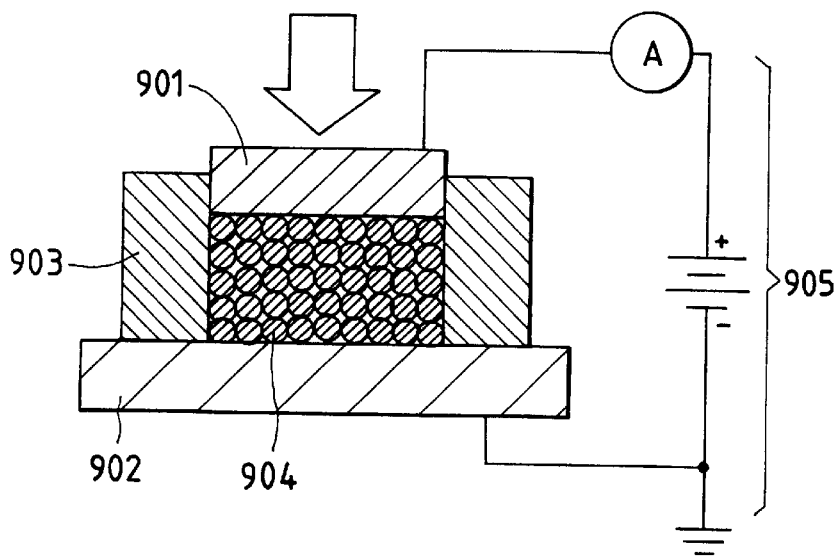
FIG. 9 is a schematic sectional view of an example of a powder resistance measuring device used to measure the difference in conductivity between the presence and the absence of coating treatment of nickel hydroxide powder forming the positive electrode active material according to the present invention.

Besides, in the state that the nickel hydroxide powder subjected to the above surface treatment and the nickel hydroxide powder not subjected to the above surface treatment (904) was separately filled between the parallel plate electrodes (901 and 902) shown in FIG. 9 and laterally fixed by insulators 903, the resistance between the electrodes was measured by means of a measuring device 905 under application of a predetermined pressure as shown by the arrow in the same figure to compare the effects of various surface treatments. As compared with the powder not subjected to the surface treatment, the resistance value was clearly reduced in the nickel hydroxide powder subjected to the surface treatment.

EXAMPLE 12

After 0.1 part of cobalt nitrate powder and 0.01 part of lithium citrate powder are mixed with 1.0 part of nickel hydroxide powder, 10 μm in average particle size in terms of molar ratio, the mixture was gradually heated to 120° C. to obtain the nickel hydroxide powder crated with a compound composed of cobalt, oxygen and lithium elements.

Incidentally, the cobalt element and oxygen element on the surface of the nickel hydroxide was confirmed by the scanning Auger. Further, the presence of the lithium element on the surface of the nickel hydroxide was confirmed by the plasma emission spectroscopy of an aqueous solution of the powdery material as separately obtained dissolved in hydrochloric acid.

Besides, following the same procedure as in Example 11, in the state that the nickel hydroxide powder subjected to the surface treatment and the nickel hydroxide powder not subjected to the surface treatment was separately filled between the parallel plate electrodes (901, 902) shown in FIG. 9 and the resistance between the electrodes was measured under application of a predetermined pressure to compare the effects of various surface treatments. As compared with the surface-untreated case, the resistance value was clearly reduced in the surface-treated nickel hydroxide powder.

EXAMPLE 13

Into a saturated solution of cobalt hydroxide dissolved in aqueous ammonium, 10 times the cobalt hydroxide amount of nickel hydroxide powder in terms of molar ratio was dipped, and potassium hydroxide was added, thereafter the mixture was boiled, whereby nickel hydroxide powder coated with potassium hydroxocobaltate (II) composed of cobalt, oxygen, hydrogen and potassium elements could be obtained.

Incidentally, the cobalt element and oxygen element on the surface of the obtained nickel hydroxide powder was confirmed by the scanning Auger microanalyzer. Further, the presence of the potassium element on the surface of the nickel hydroxide was confirmed by the plasma emission spectroscopy of an aqueous solution of the powdery material as separately obtained dissolved in hydrochloric acid.

Besides, following the same procedure as in Example 11, the nickel hydroxide powder subjected to the surface treatment and the nickel hydroxide powder not subjected to the above surface treatment was separately filled between the parallel plate electrodes (901, 902) shown in FIG. 9, the resistance between the electrodes was measured under application of a predetermined pressure to compare the effects of various surface treatments. As compared with the surface-untreated case, the resistance value was clearly reduced in the surface-treated nickel hydroxide powder.

EXAMPLE 14

Into a solution of 1 part of cobalt nitrate, 0.05 pert of zinc nitrate and 0.5 part of bromine dissolved in water, 10 times the cobalt nitrate amount of nickel hydroxide powder, 10 $\mu$m in average particle size, was dispersed in terms of molar ratio, and an aqueous solution of 3 times the cobalt nitrate amount of potassium hydroxide was added dropwise with stirring. After standing, the produced precipitation was washed with water free from carbon dioxide with decantation and filtration and dried under a reduced pressure to obtain nickel hydroxide powder coated with a compound composed of cobalt and oxygen elements.

Incidentally, the cobalt element and oxygen element on the surface of the obtained nickel hydroxide was confirmed by the scanning Auger microanalyzer, while the zinc element on the surface of the nickel hydroxide powder was confirmed by the plasma emission spectroscopy of an aqueous solution of the powdery material as separately obtained dissolved in hydrochloric acid.

Besides, following the same procedure as in Example 11, the nickel hydroxide powder subjected to the surface treatment and the nickel hydroxide powder not subjected to the surface treatment was separately filled between the parallel plate electrodes (901, 902) shown in FIG. 9, the resistance between the electrodes was measured under application of a predetermined pressure to compare the effects of various surface treatments. As compared with the surface-untreated case, the resistance value was clearly reduced in the surface-treated nickel hydroxide powder.

EXAMPLE 15

After nickel hydroxide powder, 10 $\mu$m in average particle size was dipped into an ethanol solution of pentaethoxy molybdenum, ethoxy silane and ethoxy lithium dissolved at a molar ratio of 1:0.5;0.1, the powder was separated. Then, the pentaethoxy molybdenum and ethoxy silane were hydrolysed in the air, and the mixture was heat-treated at 150° C. to obtain nickel hydroxide powder coated with a compound composed of molybdenum, silicon and oxygen elements containing lithium element.

Incidentally, the molybdenum, silicon and oxygen elements on the surface of the nickel hydroxide powder was confirmed by the scanning Auger microanalyzer, while the presence of the lithium element on the surface of the nickel hydroxide powder was confirmed by the plasma emission spectroscopy of an aqueous solution of the powdery material as separately obtained dissolved in hydrochloric acid.

Besides, following the same procedure as in Example 11, the nickel hydroxide powder subjected to the surface treatment or the nickel hydroxide powder not subjected to the surface treatment was separately filled between the parallel plate electrodes (901, 902) shown in FIG. 9 and the resistance between the electrodes was measured under application of a predetermined pressure to compare the effects of various surface treatments. As compared with the surface-untreated case, the resistance value was clearly reduced in the surface-treated nickel hydroxide powder.

[Formation of Positive Electrode]

EXAMPLE 16

After 90% by weight of the surface-coated nickel hydroxide ($Ni(OH)_2$) powder obtained in Example 11, 8% by weight of nickel (II) nickel (III) hydroxide $Ni_3O_2(OH)_4$ and 2% by weight of carboxymethylcellulose as a binding agent were mixed with each other, water was added to the mixture to obtain a paste. The paste was filled in and applied to a 1.5 mm thick foamed nickel substrate of 95% porosity having a pore diameter of 200 $\mu$m and was then dried at 120° C. for an hour. The obtained member was pressed to be adjusted in the thickness thereof. Next, the pressed member was cut to a predetermined size, a lead of nickel wire was connected thereto by the spot welding to obtain an electrode member serving as the positive electrode of a secondary cell.

Incidentally, the above nickel (II) nickel (III) hydroxide $Ni_3O_2(OH)_4$ was obtained by adding dropwise an aqueous solution of lithium hydroxide to an aqueous solution of nickel nitrate and bromine with stirring, followed by precipitation, separation and drying.

EXAMPLE 17

Using the surface-coated nickel hydroxide powder obtained in Example 12, an electrode member forming the positive electrode of a secondary cell was prepared by following the same procedure as in Example 16.

EXAMPLE 18

Using the surface-coated nickel hydroxide powder obtained in Example 13, an electrode member forming the positive electrode was prepared by following the same procedure as in Example 16.

EXAMPLE 19

Using the surface-coated nickel hydroxide powder obtained in Example 14, an electrode member forming the positive electrode was prepared by following the same procedure as in Example 16.

EXAMPLE 20

Using the surface-coated nickel hydroxide powder obtained in Example 15, an electrode member forming the positive electrode was prepared by following the same procedure as in Example 16.

Comparative Example 6

After the mixing of 92% by weight of nickel hydroxide powder and 2% by weight of cobalt oxide powder, an aqueous solution of 2% by weight of carboxymethylcellulose was added as a binding agent to thus obtain a paste. This paste was filled in and applied to a 1.5 mm thick foamed nickel substrate of 95% prosity having a pore diameter of 200 $\mu$m and dried at 120° C. for an hour. The obtained member was pressed to adjust in thickness. Next, the pressed member was cut to a predetermined size, a lead of nickel wire was connected thereto by the spot welding to obtain an electrode member forming the positive electrode.

[Preparation of Electrolyte Solution]

An aqueous solution of 6M (mol/l) potassium hydroxide and 1M (mol/l) lithium hydroxide was prepared.

[Provision of Separator]

A hydrophilified polypropylene unwoven cloth was employed.

[Preparation of Battery]

[Battery Using an Electrode Member (Negative Electrode) According to the Present Invention]

EXAMPLE 21

A group of electrodes were produced by winding the negative electrode obtained in Example 5 and the positive electrode obtained in Comparative Example 6 via an interposed separator in a cylindrical spiral shape. After inserting the electrodes into an electrode can, lead wires were welded to the portions forming the input/output terminals of the battery can and the battery cap. Then, the electrolyte solution was injected and sealing was effected by caulking to make a closed battery.

Incidentally, the battery was a positive electrode-capacity regulated battery having a positive electrode larger in capacity than a negative electrode.

EXAMPLE 22

Using the negative electrode obtained in Example 6 and the positive electrode obtained in Comparative Example 6, a positive electrode-capacity regulated closed battery was fabricated by following the same procedure as in Example 21.

EXAMPLE 23

Using the negative electrode obtained in Example 7 and the positive electrode obtained in Comparative Example 6, a positive electrode-capacity regulated closed battery was fabricated by following the same procedure as in Example 21.

EXAMPLE 24

Using the negative electrode obtained in Example 8 and the positive electrode obtained in Comparative Example 6, a positive electrode-capacity regulated closed battery was fabricated by following the same procedure as in Example 21.

EXAMPLE 25

Using the negative electrode obtained in Example 9 and the positive electrode obtained in Comparative Example 6, a positive electrode-capacity regulated closed battery was fabricated by following the same procedure as in Example 21.

EXAMPLE 26

Using the negative electrode obtained in Example 10 and the positive electrode obtained in Comparative Example 6, a positive electrode-capacity regulated closed battery was fabricated by following the same procedure as in Example 21.

[Battery to be Compared with a Secondary Cell According to the Present Invention]

Comparative Example 7

Using the negative electrode obtained in Comparative Example 1 and the positive electrode obtained in Comparative Example 6, a positive electrode-capacity regulated closed battery was fabricated by following the same procedure as in Example 21.

Comparative Example 8

Using the negative electrode obtained in Comparative Example 2 and the positive electrode obtained in Comparative Example 6, a positive electrode-capacity regulated closed battery was fabricated by following the same procedure as in Example 21.

Comparative Example 9

Using the negative electrode obtained in Comparative Example 3 and the positive electrode obtained in Comparative Example 6, a positive electrode-capacity regulated closed battery was fabricated by following the same procedure as in Example 21.

Comparative Example 10

Using the negative electrode obtained in Comparative Example 4 and the positive electrode obtained in Comparative Example 6, a positive electrode-capacity regulated closed battery was fabricated by following the same procedure as in Example 21.

Comparative Example 11

Using the negative electrode obtained in Comparative Example 5 and the positive electrode obtained in Comparative Example 6, a positive electrode-capacity regulated closed battery was fabricated by following the same procedure as in Example 21.

[Battery Using an Electrode Member (Positive Electrode) According to the Present Invention]

EXAMPLE 27

A group of electrodes were produced by winding the positive electrode obtained in Example 16 and the negative electrode obtained in Comparative Example 1 via an interposed separator in a cylindrical spiral shape. After inserting the electrodes into an electrode can, lead wires were welded to the portions forming the input/output terminals of the battery can the battery cap. Then, the electrolyte solution was injected and sealing was effected by caulking to make a closed battery.

Incidentally, the battery was a negative electrode-capacity regulated cell having an negative electrode larger in capacity than a positive electrode.

EXAMPLE 28

Using the positive electrode obtained in Example 17 and the negative electrode obtained in Comparative Example 2, a negative electrode-capacity regulated closed battery was fabricated by following the same procedure as in Example 25.

EXAMPLE 29

Using the positive electrode obtained in Example 18 and the negative electrode obtained in Comparative Example 3, a negative electrode-capacity regulated closed battery was fabricated by following the same procedure as in Example 25.

EXAMPLE 30

Using the positive electrode obtained in Example 19 and the negative electrode obtained in Comparative Example 4, a negative electrode-capacity regulated closed battery was fabricated by following the same procedure as in Example 25.

EXAMPLE 31

Using the positive electrode obtained in Example 20 and the negative electrode obtained in Comparative Example 5, a negative electrode-capacity regulated closed battery was fabricated by following the same procedure as in Example 25.

[Battery Using a Negative Electrode and a Positive Electrode According to the Present Invention]

EXAMPLE 32

A group of electrodes were produced by winding the negative electrode obtained in Example 5 and the positive electrode obtained in Example 16 via an interposed separator in a cylindrical spiral shape. After inserting the electrodes into an electrode can, lead wires were welded to the portions forming the input/output terminals of the battery can and the battery cap. Then, the electrolyte solution was injected and sealing was effected by caulking to make a closed battery.

Incidentally, the battery was a positive electrode-capacity regulated cell having a positive electrode larger in capacity than a negative electrode.

EXAMPLE 33

Using the negative electrode obtained in Example 6 and the positive electrode obtained in Example 17, a positive electrode-capacity regulated closed battery was fabricated by following the same procedure as in Example 32.

EXAMPLE 34

Using the negative electrode obtained in Example 7 and the positive electrode obtained in Example 18, a positive electrode-capacity regulated closed battery was fabricated by following the same procedure as in Example 32.

EXAMPLE 35

Using the negative electrode obtained in Example 8 and the positive electrode obtained in Example 19, a positive electrode-capacity regulated closed battery was fabricated by following the same procedure as in Example 32.

EXAMPLE 36

Using the negative electrode obtained in Example 9 and the positive electrode obtained in Example 20, a positive electrode-capacity regulated closed battery was fabricated by following the same procedure as in Example 32.

EXAMPLE 37

Using the negative electrode obtained in Example 6 and the positive electrode obtained in Example 16, a positive electrode-capacity regulated closed battery was fabricated by following the same procedure as in Example 32.

EXAMPLE 38

Using the negative electrode obtained in Example 9 and the positive electrode obtained in Example 19, a positive electrode-capacity regulated closed battery was fabricated by following the same procedure as in Example 32.

EXAMPLE 39

(1) Preparation of the Hydrogen Storage Alloy Powder Employed as the Core

Powder of magnesium-nickel alloy $Mg_2Ni$ and Ni powder were mixed in a weight ratio of 1:1 and subjected to mechanical grinding by means of a planetary ball mill in an argon gas flow. The obtained powder was confirmed to comprise Ni metal and an amorphous magnesium-nickel alloy as a result of X-ray diffraction analysis.

(2) Coating of the Hydrogen Storage Alloy Powder with a Transition Metal Oxide Layer 1.0 part by weight of flake-like copper powder and 0.5 part by weight of fine spherical powder of nickel were added to and mixed with 1 part by weight of the $Mg_2Ni$—Ni composite obtained in (1) and the mixture was molded on a nickel expanding metal by using a pressure molding machine. Then, after the molded member was cut to a predetermined sheet size, leads of nickel wire were connected to the cut member (sheet). Next, titanium and aluminum were vapor deposited on the surface of the obtained sheet with an electron beam deposition machine to coat the sheet therewith. Then, with the coated sheet dipped into an electrolyte solution of an aqueous sodium hydroxide solution, and with glassy carbon employed as the counter electrode, anodic oxidation is accomplished under application of a DC electric field between the anode of the sheet coated with titanium-aluminum and the cathode serving as the counter electrode. After water washing, the anodized member was vacuum-dried at 150° C. to fabricate an electrode member comprising a $Mg_2Ni$—Ni composite, coated with a titanium-aluminum oxide film containing the amorphous component. Incidentally, the confirmation of the titanium-aluminum oxide film containing the amorphous component was performed by the X-ray diffraction analysis. And, the oxide layer was 0.2 $\mu$m thick.

EXAMPLE 40

Using the electrode member obtained in Example 39 and the above-mentioned positive electrode obtained in Comparative Example 6, a positive-electrode capacity regulated closed secondary battery was fabricated by following the same procedure as in Example 21.

The charging/discharging test as mentioned below was carried out on the secondary battery according to Example 40 and the secondary battery according to Comparative Example 8 and the discharge capacity at the fifth cycle was estimated. Further, the overcharge test as mentioned below was conducted and the cycle life was estimated as the number of cycle the discharge capacity of which became less than 60% of the discharge capacity as obtained at the fifth cycle of the ordinary charging/discharging test.

The estimation results for the battery of Example 40 was normalized with those for the battery of Comparative Example 8 being set to 1.0. As a result, the discharge capacity and the cycle life were 1.7 and 3.2, respectively. It has been found that in an alkali secondary battery having a negative electrode composed of a powdery material as the main material comprising a core layer comprising a magnesium-nickel alloy coated with a transition metal oxide layer, especially coated with a compound oxide layer containing aluminum, excellent performance about the discharging capacity and cycle life can be obtained.

Meanwhile, the correspondence between Examples and Comparative Examples for the estimation of the characteristics and the negative electrodes and positive electrodes adopted in the batteries of Examples 21 to 38 and Comparative Examples 6 to 11 are collectively shown in the following tables.

TABLE 1

Batteries of Examples and Comparative Examples

| Example Number of Battery | Adopted Electrodes Negative electrode | Adopted Electrodes Positive electrode | Comparative Example Number of Battery | Adopted Electrodes Negative electrode | Adopted Electrodes Positive electrode |
|---|---|---|---|---|---|
| Example 21 | Example 5 | Comparative Example 6 | Comparative Example 7 | Comparative Example 1 | Comparative Example 6 |
| Example 22 | Example 6 | Comparative Example 6 | Comparative Example 8 | Comparative Example 2 | Comparative Example 6 |
| Example 23 | Example 7 | Comparative Example 6 | Comparative Example 9 | Comparative Example 3 | Comparative Example 6 |
| Example 24 | Example 8 | Comparative Example 6 | Comparative Example 10 | Comparative Example 4 | Comparative Example 6 |
| Example 25 | Example 9 | Comparative Example 6 | Comparative Example 11 | Comparative Example 5 | Comparative Example 6 |
| Example 26 | Example 10 | Comparative Example 6 | Comparative Example 8 | | |
| Example 27 | Comparative Example 1 | Example 16 | Comparative Example 7 | | |
| Example 28 | Comparative Example 2 | Example 17 | Comparative Example 8 | | |
| Example 29 | Comparative Example 3 | Example 18 | Comparative Example 9 | | |
| Example 30 | Comparative Example 4 | Example 19 | Comparative Example 10 | | |
| Example 31 | Comparative Example 5 | Example 20 | Comparative Example 11 | | |
| Example 32 | Example 5 | Example 16 | Comparative Example 7 | | |
| Example 33 | Example 6 | Example 17 | Comparative Example 8 | | |
| Example 34 | Example 7 | Example 18 | Comparative Example 9 | | |
| Example 35 | Example 8 | Example 19 | Comparative Example 10 | | |
| Example 36 | Example 9 | Example 20 | Comparative Example 11 | | |
| Example 37 | Example 6 | Example 16 | Comparative Example 8 | | |
| Example 38 | Example 9 | Example 19 | Comparative Example 11 | | |

[Estimation of the Characteristics of Batteries]

As an ordinary test, 110% of the battery capacity was charged in a constant current of an hour rate of 2 (0.5 C.) at room temperature and the rest time after the completion of charging was set to 0.5 h. Discharge was carried out in a constant current of an hour rate of 5 (0.2 C), the terminal voltage was selected at 0.8 V and the rest time after the completion of discharging was set to 0.5 h. In such a manner, charging and discharging were repeated.

As an overcharge test, 200% of the battery capacity was charged in a constant current of an hour rate of 1 (1 C) and the rest time after the completion of charging was set to 0.5 h. Discharge was carried out in a constant current of an hour rate of 2 (0.5 C), the terminal voltage was selected at 0.8 V and the discharge capacity was measured. With the rest time after the completion of discharging set to 0.5 h, charging and discharging were repeated at room temperature to measure the cycle life.

As the estimation of batteries featured by a negative electrode according to the present invention, first, two pairs each of the batteries fabricated in Examples 21, 22, 23, 24, 25 and 26 and Comparative Examples 7, 8, 9, 10 and 11 were prepared and the ordinary charging/discharging test and the overcharge test were carried out. In the ordinary charging/discharging test, the discharge capacity at the fifth cycle was estimated. In the overcharge test, the cycle life was estimated as the number of cycle the discharge capacity of which became less than 60% of the discharge capacity as obtained at the fifth cycle of the ordinary charging/discharging test. Incidentally, Table 2 shows the estimation results by normalization with those of the battery of the corresponding Comparative Example being set to 1.0.

TABLE 2

| | Ratio of discharge capacity | Ratio of cycle life |
|---|---|---|
| Example 21/Comparative Example 7 | 9.5 | 1.1 |
| Example 22/Comparative Example 8 | 1.6 | 3.5 |
| Example 23/Comparative Example 9 | 1.2 | 1.6 |
| Example 24/Comparative Example 10 | 1.2 | 1.7 |
| Example 25/Comparative Example 11 | 1.2 | 1.9 |
| Example 26/Comparative Example 8 | 1.1 | 1.3 |

From Table 2 comparing the characteristics of batteries between Examples and Comparative Examples, it has been found that the batteries using negative electrodes fabricated by using hydrogen-storing compound powder according to the present invention have a high capacity and are highly resistant to overcharge.

Besides, from the comparison between Example 21 and Comparative Example 7, it has been found that a battery having the negative electrode of a magnesium-nickel alloy containing traces of transition metal elements such as cobalt or copper formed by a chemical reaction by utilizing a difference in ionization tendency has a higher discharge capacity than a battery having that of a magnesium-nickel alloy formed by a melting process such as high-frequency melting.

Furthermore, from the comparison of characteristics between Example 26 and Comparative Example 8, it has been found that mixing auxiliary conductive materials of different shapes such as sphere in addition to the flake-like one increases the discharge capacity possibly because a rise in packing density can reduce the resistance of the electrode.

Next, as the estimation of batteries featured by positive electrodes according to the present invention, first, the ordinary charging/discharging test was carried out on batteries fabricated in Examples 27, 28, 29, 30 and 31 and in Comparative Examples 7, 8, 9, 10 and 11. In the ordinary charging/discharging test, the discharge capacity at the fifth cycle was estimated and Table 3 shows the estimation results by normalization with those of the battery of the corresponding Comparative Example being set to 1.0.

TABLE 3

|  | Ratio of discharge capacity |
| --- | --- |
| Example 27/Comparative Example 7 | 1.3 |
| Example 28/Comparative Example 8 | 1.2 |
| Example 29/Comparative Example 9 | 1.2 |
| Example 30/Comparative Example 10 | 1.2 |
| Example 31/Comparative Example 11 | 1.1 |

From the results of Table 3, it has been found that any battery having a positive electrode using a surface-treated nickel hydroxide powder according to the present invention has a larger discharge capacity possibly because the conductivity among the nickel hydroxide powder particles in the positive electrode increases to improve the utilizing efficiency of nickel hydroxide.

Next, as the estimation of batteries featured by a negative electrode and a positive electrode according to the present invention, two pairs each were prepared for the batteries fabricated in Examples 32, 33, 34, 35, 36, 37, and 38 and Comparative Examples 7, 8, 9, 10 and 11, and the ordinary charging/discharging test and the overcharge test were carried out. In the ordinary charging/discharging test, the discharge capacity at the fifth cycle was estimated. In the overcharge test, the cycle life was estimated as the number of cycle the discharge capacity of which became less than 60% of the discharge capacity as obtained at the fifth cycle of the ordinary charging/discharging test. Incidentally, Table 4 shows the estimation results by normalization with those of the battery of the corresponding Comparative Example being set to 1.0.

TABLE 4

|  | Ratio of discharge capacity | Ratio of cycle life |
| --- | --- | --- |
| Example 32/Comparative Example 7 | 11.5 | 1.1 |
| Example 33/Comparative Example 8 | 1.8 | 3.0 |
| Example 34/Comparative Example 9 | 1.4 | 1.5 |
| Example 35/Comparative Example 10 | 1.4 | 1.6 |
| Example 36/Comparative Example 11 | 1.3 | 1.8 |
| Example 37/Comparative Example 8 | 1.9 | 3.1 |
| Example 38/Comparative Example 11 | 1.4 | 1.7 |

From the results of Table 4, it has been found that batteries adopting a negative electrode and a positive electrode according to the present invention improve both in discharge capacity and overcharge resistant characteristics.

Incidentally, all examples of secondary batteries according to the present invention were nickel-metal hydride batteries, but other high-capacity alkali secondary batteries such as nickel-cadmium batteries, nickel-zinc batteries or the like, using a positive electrode according to the present invention can be fabricated and the applications of the present invention are not limited to the above examples alone.

As described above, according to the present invention, a powdery material useful for negative electrode active materials for an alkali secondary battery which is high in charge/discharge capacity and highly resistant to overcharge and an electrode member (negative electrode) excellent in characteristics using the material can be fabricated. Further, according to the present invention, a powdery material useful for positive electrode active materials for an alkali secondary battery which is high in utilization efficiency of positive electrode active material and in charge/discharge capacity and an electrode member (positive electrode) excellent in characteristics using the material can be fabricated. Further, an alkali secondary battery using the above-mentioned electrode member of the present invention as a negative electrode or a positive electrode can implement characteristics such as high capacity, resistance to overcharge and long cycle life. Furthermore, with a manufacturing method according to the present invention, a negative electrode active material, a negative electrode, a positive electrode active material and a positive electrode for alkali secondary batteries can be manufactured from an inexpensive material in a relatively easy manner. Thus, use of a manufacturing method according to the present invention enables a high-performance and low-cost alkali secondary battery to be manufactured.

What is claimed is:

1. A method for manufacturing a battery electrode member comprising at least the steps of:

preparing a hydrogen-storage alloy as a core and providing on the surface of said core a metal oxide layer having a function of preventing the oxidation of said alloy and allowing atomic hydrogen or hydrogen ions to pass therethrough;

dispersing on the surface of said metal oxide layer a metal element having a function of activating hydrogen; and forming a molded product using as the main material the material having a function of storing and releasing hydrogen obtained in the foregoing steps.

2. The method for manufacturing a battery electrode member as set forth in claim 1, wherein said step of forming a metal oxide layer having the function of preventing the oxidation of the alloy and allowing atomic hydrogen or hydrogen ions to pass therethrough comprises the step of forming a layer of a transition metal oxide composed of at least one transition metal element selected from molybdenum, tungsten, vanadium, niobium, titanium, zirconium and iridium and oxygen element.

3. The method for manufacturing a battery electrode member as set forth in claim 2, wherein said step of forming a metal oxide layer having the function of preventing the oxidation of the alloy and allowing atomic hydrogen or hydrogen ions to pass therethrough comprises the step of dipping hydrogen-storing alloy powder into at least one solution selected from a polymetallic acid salt solution, a peroxopolymetallic acid solution and a metallic acid solution of at least one transition metal element selected from molybdenum, tungsten, vanadium, niobium, titanium, zirconium and iridium to form a layer of a transition metal oxide.

4. The method for manufacturing a battery electrode member as set forth in claim 1, wherein the step of forming a metal oxide layer on the surface of the hydrogen-storing core layer comprises the step of allowing at least one metal element selected from alkali metal elements, alkaline earth metal elements and rare earth metal elements to be contained in the metal oxide layer.

5. The method for manufacturing a battery electrode member as set forth in claim 4, wherein a hydroxide or salt of an alkali metal element, an alkaline earth metal element or a rare earth metal element is added to at least one solution selected from of the polymetallic acid salt solution, peroxopolymetallic acid solution and metallic acid solution of at least one transition metal element selected from molybdenum, tungsten, vanadium, niobium, titanium, zirconium and iridium and the solution is used to form a layer of a metal oxide formed on the surface of said hydrogen-storing core layer, thereby allowing at least one metal element selected from an alkali metal element,
   an alkaline earth metal element and a rare earth metal element to be contained in the metal oxide layer outside said hydrogen-storing core layer.

6. The method for manufacturing a battery electrode member as set forth in claim 1, wherein said step of dispersing a metal element having the function of activating hydrogen comprises the step of dispersing at least one metal transition element selected from nickel, chromium, molybdenum, cobalt, copper, palladium, platinum, iron, ruthenium, rhodium, iridium, tungsten, titanium and manganese.

7. The method for manufacturing a battery electrode member as set forth in claim 1, wherein said step of dispersing a transition metal element having the function of activating hydrogen comprises the step of depositing a salt of at least one transition metal element selected from nickel, chromium, molybdenum, cobalt, copper, palladium, platinum, iron, ruthenium, rhodium, iridium, tungsten, titanium and manganese on the surface of the metal oxide layer and then reducing the deposited transition metal.

8. The method for manufacturing a battery electrode member as set forth in claim 7, wherein said transition metal salt is at least one salt selected from halide, nitrate, carbonate, organic acid salt and sulfate.

9. The method for manufacturing a battery electrode member as set forth in claim 1, wherein said step of dispersing a transition metal element comprises the step of dipping a hydrogen-storing alloy into a solution of a salt of a transition metal and then depositing a compound of the transition metal compound on the surface of the hydrogen-storing alloy powder by a reaction with a precipitant and the step of reducing the deposited compound of the transition metal.

10. The method for manufacturing a battery electrode member as set forth in claim 9, wherein said precipitant is an alkali.

11. The method for manufacturing a battery electrode member as set forth in claim 10, wherein said precipitant is at least one compound selected from hydroxides, carbonates, and ammonium salts of an alkali metal.

12. The method for manufacturing a battery electrode member as set forth in claim 9, wherein said precipitant is at least one compound selected from sodium hydroxide, potassium hydroxide, lithium hydroxide, sodium carbonate, sodium hydrogencarbonate, ammonium carbonate and urea.

13. The method for manufacturing a battery electrode member as set forth in claim 1, further comprising the step of preparing the main component of the core layer of said powdery material from nickel element and magnesium element.

14. The method for manufacturing a battery electrode member as set forth in claim 13, further comprising the step of making higher the element concentration of nickel element in the surface portion of the hydrogen-storing core layer, composed of nickel element and magnesium element, than that of the center portion of the core layer.

15. The method for manufacturing a battery electrode member as set forth in claim 13, wherein said step of preparing a powdery material composed of hydrogen-storing alloy composed of nickel element and magnesium element forming the main component of the core layer comprises at least the step of preparing the hydrogen-storing alloy powder by replacing the magnesium element in magnesium powder with nickel element by a chemical reaction utilizing a difference in ionization tendency.

16. The method for manufacturing a battery electrode member as set forth in claim 15, wherein said step of preparing a hydrogen-storing alloy composed of nickel element and magnesium element forming the main component of the core layer comprises at least the step of preparing the hydrogen-storing alloy powder by replacing of the magnesium element in the magnesium powder with nickel element by dipping the magnesium powder into a solution of a nickel salt dissolved in a solvent.

17. The method for manufacturing a battery electrode member as set forth in claim 16, wherein said solvent to dissolve the nickel salt is alcohol.

18. The method for manufacturing a battery electrode member as set forth in claim 13, wherein said step of preparing the hydrogen-storing alloy of the core part of said powdery material comprises at least the step of effecting reduction after depositing nickel hydroxide to magnesium powder.

19. The method for manufacturing a battery electrode member as set forth in claim 13, wherein further comprising the step of replacing a part of the magnesium element in said hydrogen-storing core layer composed of nickel element and magnesium element with at least one element selected from the group of elements smaller in ionization tendency than magnesium consisting of titanium, beryllium, aluminum, manganese, zinc, chromium, iron, indium, cobalt, molybdenum, tin, lead, antimony, bismuth, copper, silver, palladium and platinum.

20. The method for manufacturing a battery electrode member as set forth in claim 19, wherein the replacement of a part of the magnesium element of said hydrogen-storing core layer composed of nickel element and magnesium element with at least one element selected from the group of elements smaller in ionization tendency than magnesium consisting of titanium, beryllium, aluminum, manganese, zinc, chromium, iron, indium, cobalt, molybdenum, tin, lead, antimony, bismuth, copper, silver, palladium and platinum comprises the step of effecting the replacement by a chemical reaction utilizing a difference in ionization tendency.

21. The method for manufacturing a battery electrode member as set forth in claim 13, wherein the element ratio of magnesium to nickel of the main component elements of the core layer of said powdery material ranges from 0.8 to 2.2.

22. The method for manufacturing a battery electrode member as set forth in claim 1, further comprising the step of powdering the material obtained by dispersing a metal element on the metal oxide layer on the surface of the said hydrogen-storing alloy in the atmosphere containing an inert gas or hydrogen gas.

23. The method for manufacturing a battery electrode member as set forth in claim 1, wherein a layer comprising the powdery material comprising a hydrogen-storing compound serving as the main material is formed on a collector through a sintering step to obtain said member.

24. The method for manufacturing a battery electrode member as set forth in claim 1, wherein a layer comprising the powdery material comprising a hydrogen-storing compound serving as the main material is formed on a collector with the aide of a binding agent to obtain said member.

25. The method for manufacturing a battery electrode member as set forth in claim 1, wherein said member is manufactured by using at least two auxiliary conductive materials of different shapes selected from the group consisting of flake-like, spherical, filament-like, needle-like and spiky shapes in addition to the compound powdery material as the main material.

26. The method for manufacturing a battery electrode member as set forth in claim 25, wherein at least one material selected from a carbonaceous material, nickel, copper, silver, indium and tin is used as the auxiliary conductive materials.

27. The method for manufacturing a battery electrode member as set forth in claim 26, wherein said carbonaceous material comprises amorphous carbon of graphite.

28. The method for manufacturing a battery electrode member as set forth in claim 1, further comprising the step of subjecting said powdery material to a heat treatment.

29. The method for manufacturing a battery electrode member as set forth in claim 28, wherein the temperature of said heat treatment ranges from 100 to 600° C.

30. The method for manufacturing a battery electrode member as set forth in claim 28, wherein said heat treatment step is carried out in the atmosphere composed of at least one gas selected from nitrogen gas, argon gas, helium gas and hydrogen gas or under a reduced pressure.

31. The method for manufacturing a battery electrode member as set forth in claim 1, further comprising the step of subjecting said powdery material to a hydrogen plasma treatment.

32. The method for manufacturing a battery electrode member as set forth in any one of claims 1 to 31, wherein said electrode member is an electrode of a/secondary cell using an alkali for the electrolyte.

33. A method for manufacturing a battery electrode member comprising:

the step of preparing a powdery material comprising nickel hydroxide coated either with a compound higher in conductivity than nickel hydroxide comprising at least one element selected from cobalt element and nickel element and oxygen element, containing 0.5 atomic % to 10 atomic % of at least one element selected from lithium, potassium, manganese, aluminum, zinc, manganese, molybdenum, tungsten, vanadium and titanium or with a compound higher in conductivity than nickel hydroxide comprising at least one element selected from molybdenum, tungsten, vanadium and titanium and oxygen and hydrogen elements; and the step of shaping said powdery material to obtain said member.

34. The method for manufacturing a battery electrode member as set forth in claim 33, further comprising the step of preparing the nickel hydroxide powder coated with cobalt hydroxide or nickel hydroxide, containing an element selected from lithium, potassium, manganese, aluminum, zinc, manganese, molybdenum, tungsten, vanadium and titanium by the reaction with an alkali after dispersing nickel hydroxide powder into a solution of a cobalt salt or nickel salt with at least one element selected from lithium, potassium, manganese, aluminum, zinc, manganese, molybdenum, tungsten, vanadium and titanium added thereto.

35. The method for manufacturing a battery electrode member as set forth in claim 34, wherein lithium hydroxide or potassium hydroxide is employed as said alkali.

36. The method for manufacturing a battery electrode member as set forth in claim 33, further comprising the step of dipping nickel hydroxide powder into a saturated solution of cobalt hydroxide dissolved in ammonia and boiling the mixed solution after the addition of lithium hydroxide or potassium hydroxide to prepare the nickel hydroxide powder coated either with lithium hydroxocobaltate (II) composed of cobalt, oxygen, hydrogen and lithium elements or with potassium hydroxocobaltate (II) composed of cobalt, oxygen, hydrogen and potassium elements.

37. The method for manufacturing a battery electrode member as set forth in claim 33, further comprising the step of mixing nickel hydroxide powder with cobalt nitrate or nickel nitrate and an organic acid salt of an alkali metal which is decomposed at least at 100° C. and then heating the mixture to a temperature at which cobalt nitrate or nickel nitrate and the organic acid salt are decomposed to prepare the nickel hydroxide powder coated either with a compound composed of cobalt, oxygen and alkali metal elements or with a compound composed of nickel, oxygen and alkali metal elements.

38. The method for manufacturing a battery electrode member as set forth in claim 37, wherein said salt of alkali metal which is decomposed at least at 100° C. is lithium acetate or lithium citrate.

39. The method for manufacturing a battery electrode member as set forth in claim 33, further comprising the step of dipping nickel hydroxide powder into one at least solution selected from a polymetallic acid salt solution, a peroxopolymetallic acid solution and a metallic acid solution of at least one metal element selected from molybdenum, tungsten, vanadium, niobium, titanium, zirconium, and iridium and then effecting drying and heating treatment to prepare the nickel hydroxide powder coated with a compound composed of said metal element(s) and oxygen and hydrogen elements.

40. The method for manufacturing a battery electrode member as set forth in claim 33, further comprising the step of mixing said powdery material comprising nickel hydroxide with 1–30% by weight of nickel (II) nickel (III) hydroxide and using the obtained mixture to obtain said member.

41. The method for manufacturing a battery electrode member as set forth in claim 40, further comprising the step of preparing said nickel (II) nickel (III) hydroxide by using an alkaline material.

42. The method for manufacturing a battery electrode member as set forth in claim 40, further comprising the step-of preparing said nickel (II) nickel (III) hydroxide by using nickel nitrate, an alkali hydroxide and bromine.

43. The method for manufacturing a battery electrode member as set forth in claim 40, comprising the step of preparing said nickel (II) nickel (III) hydroxide by using nickel, an alkali hydroxide and an alkali peroxide.

44. The method for manufacturing a battery electrode member as set forth in any one of claims 33 to 43, wherein said battery electrode member is for use as the main material of the positive electrode of a secondary cell using an alkali as the electrolyte.

45. A method for manufacturing a battery electrode member comprising:

the step of preparing a powdery material comprising nickel hydroxide coated either with a compound higher in conductivity than nickel hydroxide comprising at least one element selected from cobalt element and nickel element and oxygen element, containing 0.5 atomic % to 10 atomic % of at least one element selected from lithium, potassium, manganese; aluminum, zinc, manganese, molybdenum, tungsten, vanadium and titanium or with a compound higher in conductivity than nickel hydroxide comprising at least one transition metal element selected from molybdenum, tungsten, vanadium and titanium and oxygen and hydrogen elements; and the step of filling said powdery material in a porous collector.

46. The method for manufacturing a battery electrode member as set forth in claim 45, wherein the material of said porous collector is nickel metal.

47. The method for manufacturing a battery electrode member as set forth in claim 45, further comprising the step of filling in the porous collector at least two powdery auxiliary conductive materials of different shapes selected from the group consisting of flake-like, spherical, filament-like, needle-like and spiky shapes, in addition to said powdery material to prepare said member.

48. The method for manufacturing a battery electrode member as set forth in claim 47, wherein at least one material selected from carbonaceous material, nickel, copper, silver, indium and tin is used as the auxiliary conductive material.

49. The method for manufacturing a battery electrode member as set forth in claim 48, wherein said carbonaceous material comprises amorphous carbon or graphite.

50. A method for manufacturing a battery electrode member as set forth in any one of claims 45 to 49, wherein said electrode member is for use as the positive electrode of a secondary cell using an alkali as the electrolyte.

51. A method for manufacturing a battery electrode member formed of a powdery material as the main material having a function of electrochemically storing and releasing hydrogen comprising at least the steps of:

preparing a hydrogen storage core part comprising a magnesium-nickel alloy as the main component and providing a metal oxide layer on the surface of said core part having a function of preventing the oxidation of the alloy and allowing atomic hydrogen or hydrogen ions to pass therethorugh; and forming a molded product using as the main material the material having a function of storing and releasing hydrogen obtained in the foregoing steps.

* * * * *

UNITED STATES PATENT AND TRADEMARK OFFICE
CERTIFICATE OF CORRECTION

PATENT NO.     : 6,329,101 B1
DATED          : December 11, 2001
INVENTOR(S)    : Soichiro Kawakami It is certified that error appears in the above-identified patent and that said Letters Patent is hereby corrected as shown below:

Column 1,
Line 13, "and positive" should read -- and a positive --.

Column 2,
Line 42, "another-object" should read -- another object --.

Column 5,
Line 64, "element" should be deleted.

Column 10,
Line 51, "storing" (second occurrence) should be deleted.

Column 13,
Line 14, "the" (second occurrence) should be deleted.

Column 15,
Line 36, "trimothoxy" should read -- trimethoxy --;
Line 37, "VO(O-n-$C_3H_7$)," should read -- VO(O-n$C_3H_7$)$_3$, -- ; and
Line 66, "method the" should read -- method, the --.

Column 16,
Line 1, "(Core" should read -- Core --.

Column 17,
Line 11, "too many spaces" should be deleted;
Line 17, "a auxiliary" should read -- an auxiliary --; and
Line 48, "(Surface" should read -- ¶ (Surface --.

Column 18,
Line 67, "the" (first occurrence) should be deleted.

Column 19,
Line 3, "Hydrogen" should read -- hydrogen --.

UNITED STATES PATENT AND TRADEMARK OFFICE
CERTIFICATE OF CORRECTION

PATENT NO. : 6,329,101 B1
DATED : December 11, 2001
INVENTOR(S) : Soichiro Kawakami It is certified that error appears in the above-identified patent and that said Letters Patent is hereby corrected as shown below:

Column 20,
Line 2, "the" (third occurrence) should be deleted.

Column 21,
Line 22, "elec-" should be deleted.;
Line 23, "trolytes" should be deleted; and
Line 51, "the lateral" should read -- lateral --.

Column 22,
Line 15, "607/ a" should read -- 607/a --.

Column 23,
Line 17, "cooper-clad" should read -- copper-clad --; and
Line 18, "capper" should read -- copper --.

Column 30,
Line 26, "crated" should read -- coated --.

Column 32,
Line 54, "the" should be deleted;
Line 59, "prosity" should read -- porosity --; and
Line 61, "in thickness." should read -- its thickness. --.

Column 34,
Line 40, "can the" should read -- can and the --; and
Line 44, "an negative" should read -- a negative --.

Column 37,
Table 1, "Battereies" should read -- Batteries --; and
Line 43, "(0.5 C.)" should read -- (0.5 C) --.

UNITED STATES PATENT AND TRADEMARK OFFICE
CERTIFICATE OF CORRECTION

PATENT NO.   : 6,329,101 B1
DATED        : December 11, 2001
INVENTOR(S)  : Soichiro Kawakami It is certified that error appears in the above-identified patent and that said Letters Patent is hereby corrected as shown below:

Column 43,
Line 22, "of" should read -- or --;
Line 40, "a/secondary" should read -- a secondary --;
Line 52, "manganese," should read -- magnesium, --; and
Line 65, "manganese," should read -- magnesium, --.

Column 44,
Line 2, "manganese," should read -- magnesium, --; and
Line 55, "step-of" should read -- step of --.

Column 45,
Line 7, "manganese;" should read -- manganese, --; and
Line 8, "manganese," should read -- magnesium, --.

Column 46,
Line 21, "therethorugh;" should read -- therethrough; --.

Signed and Sealed this

Fifth Day of August, 2003

JAMES E. ROGAN
*Director of the United States Patent and Trademark Office*